United States Patent [19]

Higashiyama et al.

[11] Patent Number: 5,123,043
[45] Date of Patent: Jun. 16, 1992

[54] RADIO COMMUNICATION METHOD AND SYSTEM

[75] Inventors: Mitsuo Higashiyama, Kanagawa; Naoto Iwahashi, Tokyo; Takushi Kunihiro, Kanagawa, all of Japan; Jun Nakai, Dallas, Tex.

[73] Assignee: Sony Corporation, Tokyo, Japan

[21] Appl. No.: 357,028

[22] Filed: May 25, 1989

Related U.S. Application Data

[62] Division of Ser. No. 98,044, Sep. 17, 1987.

[30] Foreign Application Priority Data

Sep. 18, 1986 [JP] Japan .................................. 61-220295

[51] Int. Cl.⁵ .......................................... H04Q 7/00
[52] U.S. Cl. ........................................ 379/62; 379/58
[58] Field of Search ....................... 379/58, 61, 62, 63

[56] References Cited

U.S. PATENT DOCUMENTS

| 4,144,412 | 3/1979 | Ito et al. | 379/59 |
|---|---|---|---|
| 4,242,538 | 12/1980 | Ito et al. | 379/60 |
| 4,352,955 | 10/1982 | Kai et al. | 379/63 X |
| 4,633,509 | 12/1986 | Scheinert . | |
| 4,650,928 | 3/1987 | Numata . | |
| 4,723,264 | 2/1988 | Sasuta et al. | 379/58 |
| 4,802,200 | 1/1989 | Murata et al. | 379/61 |
| 4,829,554 | 5/1989 | Barnes et al. | 379/58 |

FOREIGN PATENT DOCUMENTS

| 0136517 | 4/1985 | European Pat. Off. . | |
|---|---|---|---|
| 0167331 | 1/1986 | European Pat. Off. . | |
| 0265943 | 5/1988 | European Pat. Off. | 379/61 |
| 0054096 | 3/1988 | Japan | 379/61 |
| 0086930 | 4/1988 | Japan | 379/61 |
| 2163323A | 2/1986 | United Kingdom . | |
| 2166622A | 5/1986 | United Kingdom . | |

OTHER PUBLICATIONS

Japanese Patent Abstract, vol. 3, No. 31.
Japanese Patent Abstract, vol. 9, No. 106.
Japanese Patent Abstract, vol. 9, No. 298.
Japanese Patent Abstract, vol. 10, No. 221.

*Primary Examiner*—James L. Dwyer
*Assistant Examiner*—M. W. Shehata
*Attorney, Agent, or Firm*—Lewis H. Eslinger; Jay H. Maioli

[57] ABSTRACT

A method and system for radio communication between at least one parent communication unit and a plurality of slave communication units. A slave communication unit transmits an automatic answer signal in response to an incomming call receipt signal transmitted from the parent communication unit. When one of the slave communication units makes a called-person's answer to the incomming call receipt signal, it transmits a called-person's answer signal. If interference occurs between the automatic and called-person's answer signals, the parent communication unit provides a command, causing the slave communication units to stop the automatic and called-person's answer signals and permits the slave communication unit which transmits the called-person's answer signal to communicate with the parent communication unit.

5 Claims, 20 Drawing Sheets

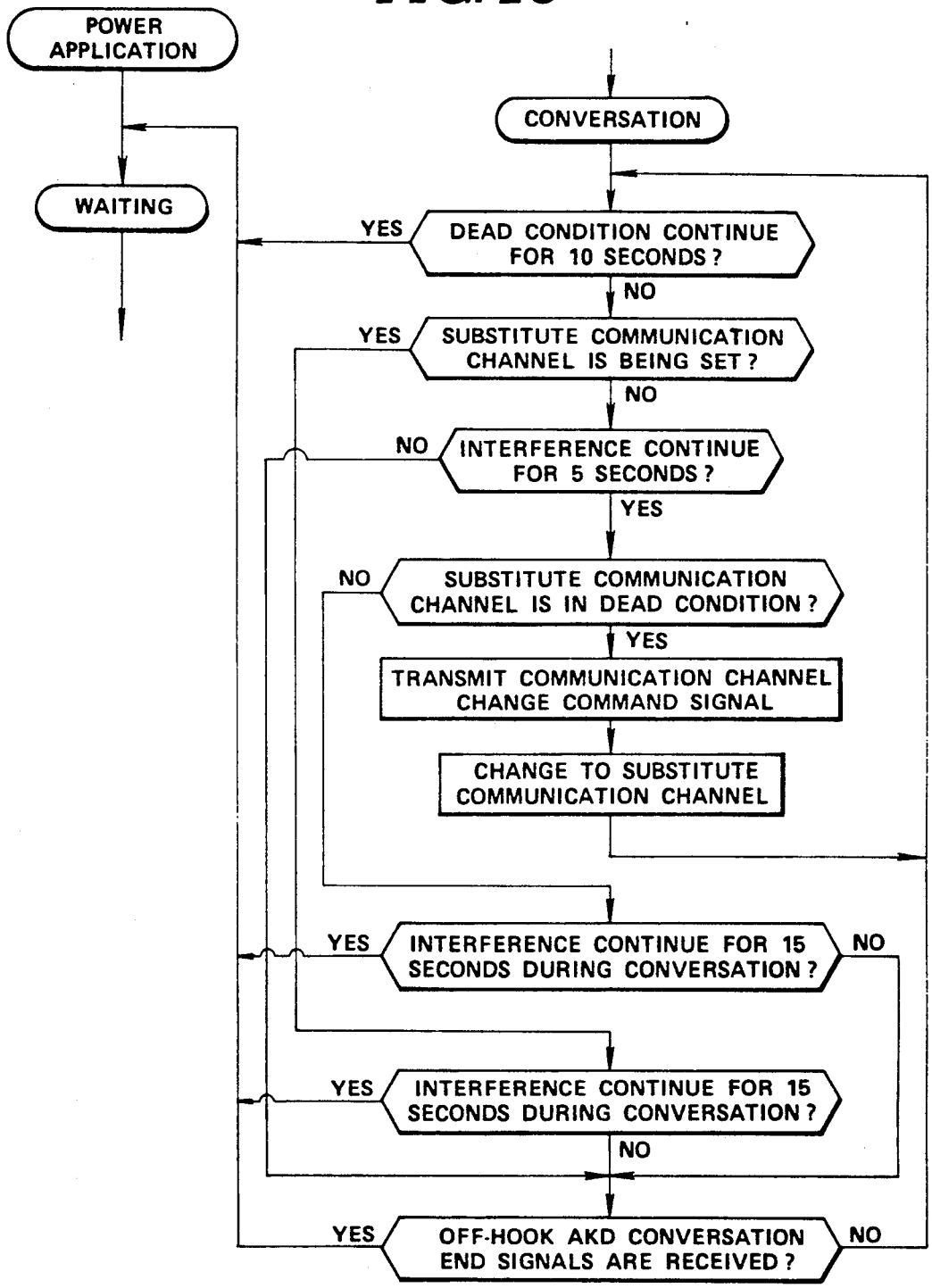

RADIO COMMUNICATION METHOD AND SYSTEM

This is a division of application Ser. No. 07/098,044, filed Sep. 17, 1989.

BACKGROUND OF THE INVENTION

This invention relates to a method for radio communication between at least one parent communication unit and a plurality of slave communication units.

Such a radio communication system includes a cordless telephone system for providing radio communication of a handset with a telephone network. In order to permit a plurality of handsets to come into contact with each telephone line, it is desirable that the cordless telephone system be of the multi-channel access type where one of the handsets shears a plurality of communication channel with the other handsets With the multi-channel access type cordless telephone system, one handset can communicate through a searched available channel with the telephone line or another handset. A frequency band is used in communication from the former to the latter and another frequency band is used in communication from the latter to the former.

One problem which occurs with this type of radio communication system is that when two or more handsets make answers, in a short interval, to an incomming call transmitted through a telephone line, no handsets can communicate with the telephone line due to radio interference between answer signals transmitted from the handsets. Thus, the need exists for a practical approach which permits communication of the telephone line with one handset which makes an answer to the incomming call at a time earlier than the other handsets like wire telephone systems.

SUMMARY OF THE INVENTION

Therefore, a main object of the invention is to provide an improved radio communication method and system which is free from the problems associated with conventional radio communication systems.

It is another object of the invention to provide a radio communication method and system which permits a parent communication unit to come into contact with only one slave communication unit which makes a called-person's answer to a call signal transmitted from the parent communication unit to a plurality of slave communication units.

It is still another object of the invention to provide a radio communication method and system which permits any of slave communication units to make a called-person's answer to an incomming call transmitted through an outside line.

It is still another object of the invention to provide a radio communication method and system which permits a slave communication unit to transmit a call while a parent communication unit transmits a call signal to a plurality of slave communication units.

It is still another object of the invention to provide a radio communication method and system which permits each slave communication unit to make an answer to an incomming call transmitted through selected one of a plurality of outside lines.

It is still another object to provide a radio communication method and system which can transfer conversation from one slave communication unit to another slave communication unit.

It is still another object to provide a radio communication method and system which can return one slave telephone unit into an initial condition communicating with a parent communication unit when no called-person's answer signal is transmitted from another slave communication unit to which conversation is to be transferred from the one slave communication unit.

It is still another object of the invention to provide a radio communication method and system which utilizes a plurality of control channels to prevent interference of control signals transmitted from respective parent communication units.

It is still another object of the invention to provide a radio communication method and system which can maintain proper telephone line controls and can perform rapid channel settings even when it is subject to radio interference.

It is still another object of the invention to provide a radio communication method and system which can detect a speech quality reduction caused by any of reasons.

There is provided, in accordance with the invention, a method for radio communication between at least one parent communication unit and a plurality of slave communication units. The method comprises the steps of: specifying a representative slave communication unit for one of the slave communication units; transmitting a call signal from the parent communication unit; transmitting an automatic answer signal from the representative slave communication unit automatically in response to receipt of the call signal; when a called-person's answer is made to the call signal by one of the slave communication units, transmitting a called-person's answer signal from the one slave communication unit; detecting the present of interference between the automatic answer signal and the called-person's answer signal; terminating the transmission of the called-person's signal from the one slave communication unit when the interference occurs; transmitting an identification signal from the one slave telephone unit to identify that the called-person's answer signal was transmitted from the one slave communication unit; and transmitting a specification signal from the parent communication unit in response to receipt of the identification signal to specify the one slave communication unit as a slave communication unit communicable with the parent communication unit.

In another aspect of the invention, a radio communication system is provided for radio communication between at least one parent communication unit and a plurality of slave communication units. The system comprises one of the slave communication units being specified as a representative slave communication unit; means for transmitting a call signal to the slave telephone units; means for detecting the presence of interference between an automatic answer signal transmitted in response to the call signal from the representative communication unit and a called-person's answer signal transmitted from one of the slave telephone units which makes a called-person's answer to the call signal; means for transmitting an interference indication signal when the interference is detected; means for receiving an identification signal transmitted from the one slave communication unit; and means responsive to the identification signal for transmitting a specification signal to specify the one slave communication unit as a slave communication unit communicable with the parent communication unit.

In another aspect of the invention, a radio communication system is provided for radio communication between at least one parent communication unit and a plurality of slave communication unit. The system comprises one of the slave communication units being specified as a representative communication unit; means for transmitting a called-person's answer signal from one of the slave telephone unit when the one slave communication unit makes a called-person's answer to a call signal transmitted from the parent communication unit; means for terminating the transmission of the called-person's answer signal from the one slave telephone unit in response to receipt of an interference indication signal transmitted from the parent communication unit when interference is detected between an automatic answer signal transmitted from the representative slave communication unit and the called-person's answer signal; means for transmitting an identification signal; and means for receiving a specification signal from the parent communication unit which transmits the specification signal in response to receipt of the identification signal, the specification signal specifying the one slave communication unit as a slave communication unit communicable with the parent communication unit.

In another aspect of the invention, a method is provided for radio communication between a plurality of parent communication units and a plurality of slave communication units. The method comprises the steps of: specifying one of the slave communication units as a representative slave communication unit; transmitting a call signal from one of the parent communication units; transmitting an automatic answer signal from the representative slave communication unit automatically in response to receipt of the call signal; when a called-person's answer is made to the call signal by one of the slave communication units, transmitting a called-person's answer signal from the one slave communication unit; detecting the presence of interference between the automatic answer signal and the called-person's answer signal; terminating the transmission of the called-person's answer signal from the one slave communication unit when the interference is detected; transmitting an identification signal from the one slave communication unit to identify that the called-person's answer signal was transmitted from the one slave communication unit; and transmitting a specification signal from the one parent communication unit in response to receipt of the identification signal to specify the one slave communication unit as a slave communication unit communicable with the one parent communication unit.

In another aspect of the invention, a radio communication system is provided for radio communication between a plurality of parent communication units and a plurality of slave communication units. The system comprises one of the parent communication units being specified as a first representative communication unit; means for transmitting a call signal to the slave communication units; means for detecting the presence of interference between an automatic answer signal transmitted from the first representative communication unit and a called-person's answer signal transmitted from one of the slave communication units which makes a called-person's answer to the call signal; means for transmitting an interference indication signal when the interference is detected; means for receiving an identification signal from the one slave communication unit; means for transmitting a specification signal to specify the one slave communication unit as a communicable slave communication unit; and means for specifying another slave communication unit as a second representative slave communication unit when the first representative slave communication unit makes a called-person's answer.

In another aspect of the invention, a radio communication system is provided for radio communication between a plurality of parent communication units and a plurality of slave communication units. The system comprises means for receiving a representative slave communication unit specifying signal from one of the parent communication units; means for transmitting an automatic answer signal in response to a call signal from the one parent communication unit in the case of receipt of the representative slave unit specifying signal; means for transmitting a called-person's answer signal called-person's answer is made to the call signal; means for terminating the transmission of the called-person's answer signal in response to receipt of an interference indication signal transmitted when interference is detected between the automatic answer signal and the called-person's answer signal; means for transmitting an identification signal; and means for receiving a slave communication unit specifying signal transmitted from a parent communication unit which received the identification signal, the slave communication unit specifying signal specifying a communicable slave communication unit.

In another aspect of the invention, a method is provided for radio communication between at least one parent communication unit and a plurality of slave communication units. The method comprises the steps of: transmitting a transfer request signal through a first channel from a first slave communication unit, the transfer request signal including information specifying a slave communication unit to which transfer is requested; transmitting a transmission inhibit signal through the first channel from the parent communication unit to inhibit the signal transmission from the first slave communication unit after the transfer request signal is received; transmitting a transfer request receipt signal through a second channel from the parent communication unit to a second slave communication unit; transmitting an answer signal through the second channel from the second slave communication unit in response to receipt of the transfer request receipt signal; making a channel change to the first channel for the second slave communication unit; transmitting a called-person's answer signal through the first channel when the second slave communication unit makes a called-person's answer; transmitting a conversation start signal through the first channel from the parent communication unit to the first and second slave communication units; making conversation through the first channel from the first slave communication unit to the second slave communication unit in response to receipt of the conversation start signal; transmitting a conversation end signal through the first channel from the first slave communication unit; and making a channel change to the second channel for the first slave communication unit.

In another aspect of the invention, a method is provided for radio communication between at least one parent communication unit and a plurality of slave communication units. The method comprises the steps of: transmitting a transfer request signal through a first channel from a first slave communication unit, the transfer request signal including information specifying a salve communication unit to which transfer is requested; transmitting a transmission inhibit signal through the first channel to inhibit the signal transmission from the first slave communication unit after the transfer request signal is received; transmitting a transfer request receipt signal through a second channel from the parent communication unit to a second slave communication unit; transmitting an answer signal through the second channel from the second slave communication unit in response to receipt of the transfer request receipt signal; making a channel change to the first channel for the .second slave communication unit; transmitting a non-modulated carrier through the first channel from the second slave communication unit; transmitting a hold release signal through the first channel when the first slave communication unit releases its hold condition; transmitting an interference indication signal through the first channel when the parent communication unit detects interference between the non-modulated carrier and the hold release signal; re-transmitting the hold release signal through the first channel from the first slave communication unit in response to receipt of the interference indication signal; transmitting a conversation end signal in response to receipt of the re-transmitted hold release signal; and making a channel change to the second channel for the second slave communication unit.

In another aspect of the invention, a method is provided for radio communication between at least one parent communication unit and a plurality of slave communication units. The method comprises the steps of: transmitting a transfer request signal through a first channel from a first slave communication unit, the transfer request signal including information specifying a slave communication unit to which transfer is requested; transmitting a slave communication unit specifying signal through the first channel from the parent communication unit in response to receipt of the transfer request signal, the slave communication unit specifying signal specifying a second slave communication unit as the slave communication unit to which transfer is requested; making conversation through the first channel from the first slave communication unit to the second slave communication unit in response to receipt of the slave communication unit specifying signal; transmitting a called-person's answer signal when a called person's answer is made by the second slave communication unit; transmitting an interference indication signal from the parent communication unit when interference is detected between a voice signal transmitted from the first slave communication unit and the called-person's answer signal transmitted from the second slave communication unit; transmitting a conversation end signal through the first channel from the first slave communication unit; and terminating the signal transmission from the first slave communication unit in response to receipt of the interference indication signal.

In another aspect of the invention, a multi-channel access type cordless telephone system is provided for radio communication between a plurality of slave telephone units and a plurality of outside lines. The system comprises a control station including a plurality of parent communication units for communication with the slave communication units, and another parent communication unit for scanning channels assigned for conversation to search an available channel and/or controlling the slave communication units through a control channel to permit radio communication.

In another aspect of the invention, a method utilizing a plurality of communication channels is provided for radio communication between a plurality of communication units. The method comprises the steps of: providing a plurality of control channels for controlling the communication channels; and changing the control channels in a predetermined sequence.

In another aspect of the invention, a radio communication system is provided. The system comprises means for inputting a voice signal having a frequency band, means for producing predetermined speech quality monitoring data monopolizing a frequency band except for the frequency band of the voice signal, means for frequency-multiplex transmitting the voice signal and the predetermined speech quality monitoring data, means for receiving the frequency-multiplex transmitted voice signal and speech quality monitoring data, means for separating the frequency-multiplex transmitted speech quality monitoring data from the frequency-multiplex transmitted voice signal, and means for detecting the speech quality based upon a comparison of the separated speech quality monitoring data with the predetermined speech quality monitoring data.

In another aspect of the invention, there is provided a method utilizing a plurality of channels for radio communication between a plurality of parent communication units and a plurality of slave communication units. The method comprises the steps of: transmitting a communication channel specifying signal through a first communication channel from one of the parent communication units, the communication channel specifying signal specifying the first communication channel; making a channel change to the first communication channel for available ones of the slave communication units in response to receipt of the communication channel specifying signal; transmitting a call signal through the first communication channel from a parent communication unit to which the first communication channel is assigned, the call signal including information indicating an outside line through which an incomming call is transmitted; transmitting a called person's answer signal through the first communication channel when a called-person's answer is made by one of the slave communication units to which the first communication channel is assigned, the called-person's answer signal including information indicating the one slave communication unit; transmitting a slave communication unit specifying signal through the first communication channel from the one parent communication unit in response to receipt of the called-person's answer signal, the slave communication unit specifying the signal specifying a slave communication unit communicable with the one parent communication unit; transmitting a channel specifying signal through the first communication channel from the one parent communication unit in response to receipt of the called-person's answer signal, the channel specifying signal specifying a channel except for the first communication channel; and making a channel change from the first communication channel to the channel specified by the channel specifying signal for the slave communication units except for the slave communication unit specifying signal.

BRIEF DESCRIPTION OF THE DRAWINGS

This invention will be described in greater detail by reference to the following description taken in connection with the accompanying drawings, in which like numerals identify like elements in the several figures and in which:

FIG. 16 is a flow diagram used in explaining the operation of the cordless telephone system.

DETAILED DESCRIPTION OF THE INVENTION

Figure 1:
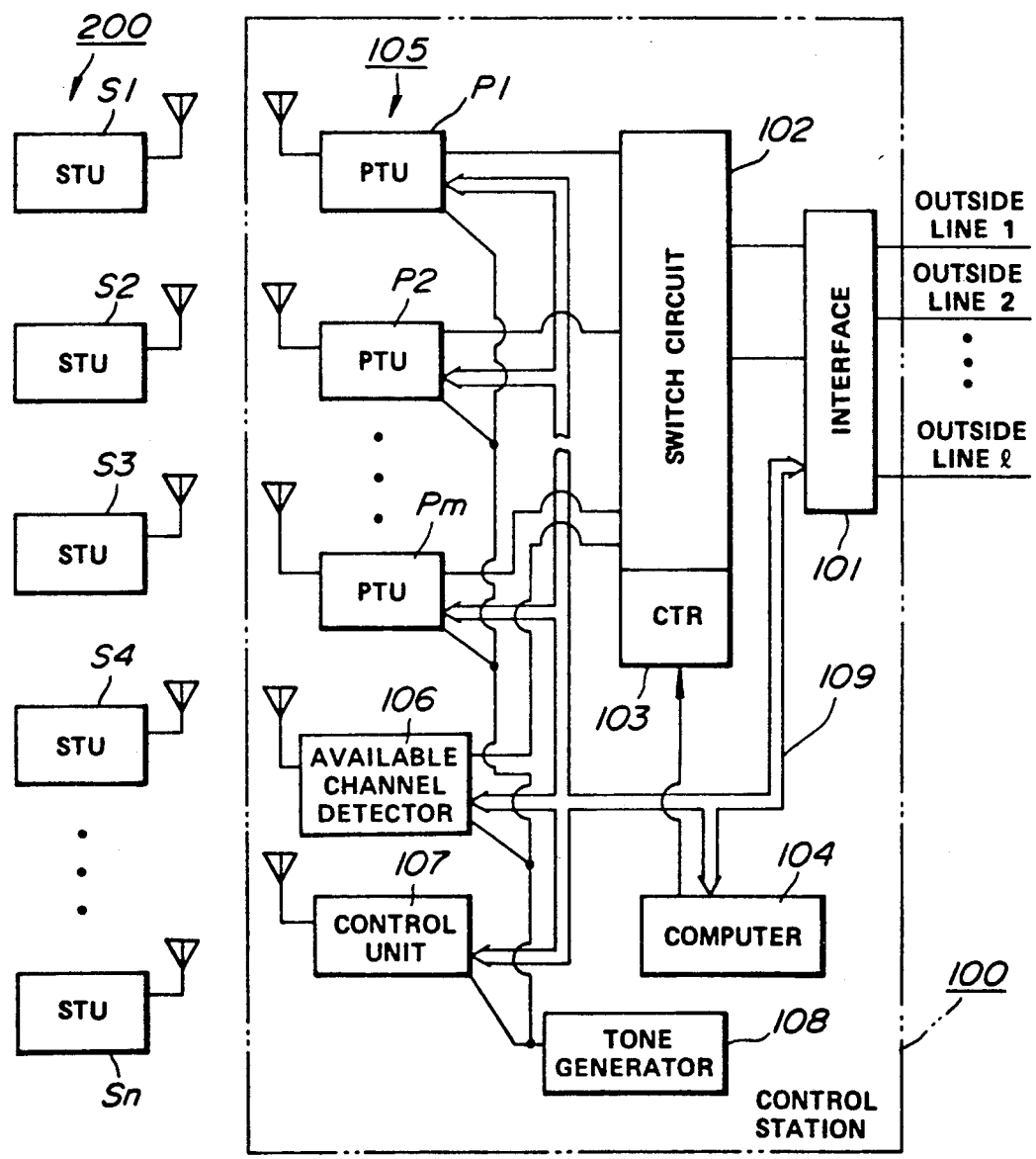
FIG. 1 is a schematic block diagram showing one embodiment of a cordless telephone system made in accordance with the invention.

With reference to the drawings, wherein like numerals refer to like parts in the several views, and in particular to FIG. 1, there is shown a schematic diagram of a cordless telephone system embodying the invention. The cordless telephone system includes a parent station 100 and a group 200 including a number n of slave telephone units (STU) S1, S2, . . . Sn. The control station 100 comprises an interface section 101, a switching circuit 102, a control circuit 103, and a control section 104. The parent station 100 also comprises a group 105 including a number m of parent telephone units (PTU) P1, P2, . . . Pm, an available channel detection unit 106, a control unit 107, and a tone generator circuit 108.

The available channel detector unit 106 scans the available channels and the control unit 107 permits communication with the slave telephone units S1, S2, . . . Sn through control channels. Normally, these functions of the units 106 and 107 are performed in each of the parent telephone units. It is noted, therefore, that the units 106 and 107, which are substantially the same in structure as the parent telephone units, may be referred to as parent telephone units. In addition, the units 106 and 107 may be removed from the parent station 100. The tone generator circuit 108 produces dial-tone, busy-tone and ring-tone signals to the parent telephone units P1, P2, . . . Pm, 106 and 107.

The control section 104 employs a digital computer to have a stored program control. The control section 104 communicates with the rest of the control station 100 via data bus 109. The control section 104 receives information from the parent telephone units P1, P2, . . . Pm, 106 and 107 and controls the switching circuit 102 through the control circuit 103. The control circuit 103 operates on command from the control section 104 to cause the switching circuit 102 to select an available channel connected to the corresponding one of the parent telephone units P1, P2, . . . Pm. The interface section 101 operates on command from the control section 104 to connect the selected channel through one of the outside lines 1, 2, . . . 1 to the private branch exchange (PBX) station or the telephone network.

Figure 2:
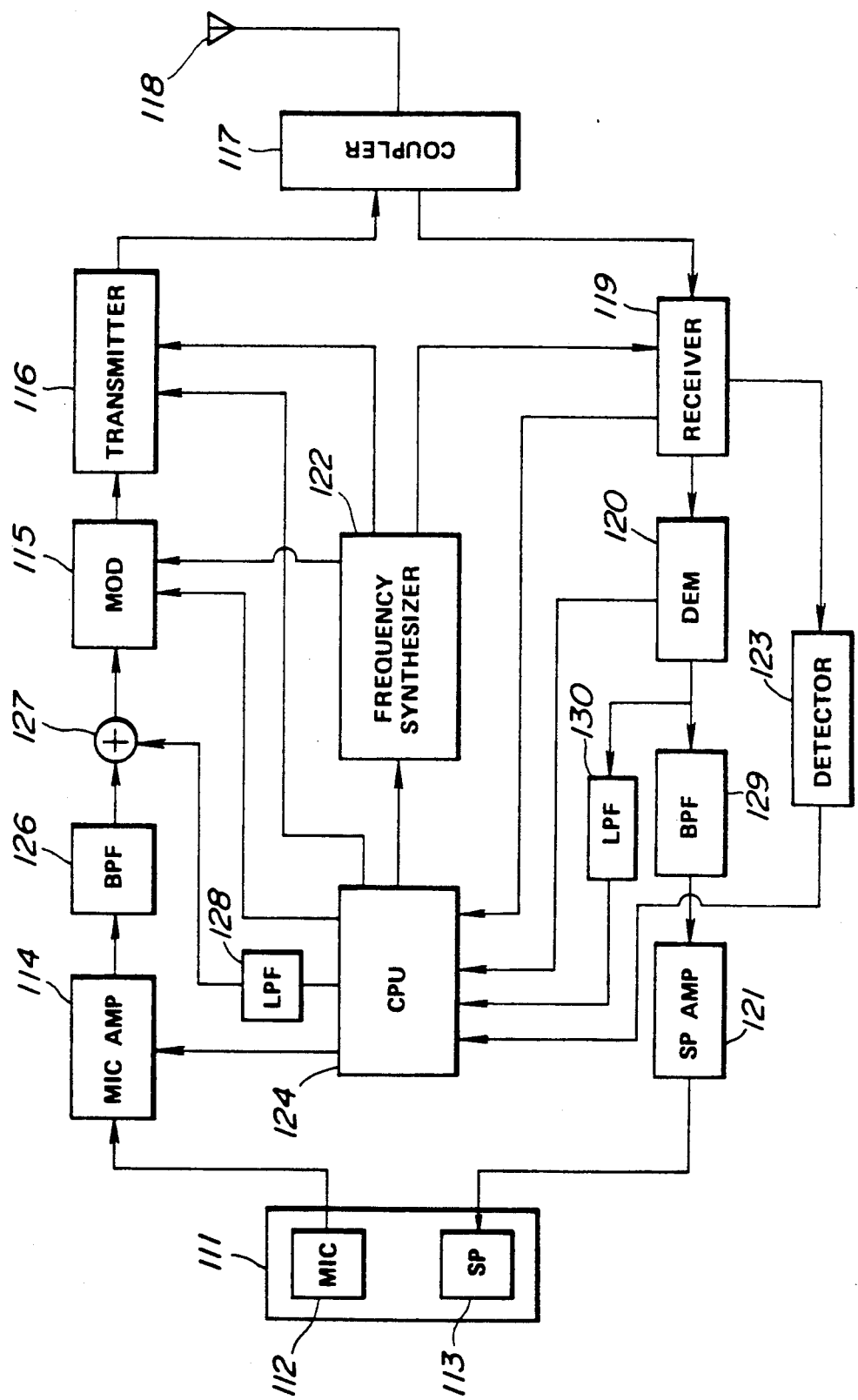
FIG. 2 is a block diagram showing the detailed arrangement of each of the parent telephone units used in the cordless telephone system.

Referring to FIG. 2, each of the parent telephone units P1, P2, . . . Pm includes a handset 111 which is shown as including a microphone 112 and a speaker 113 for voice audio. The voice audio from the microphone 112 is amplified or attenuated by the microphone amplifier 114. The amplified or attenuated signal is applied from the microphone amplifier 114 through a bandpass filter 126 and an adder 127 to an FM modulator 115 where it is FM modulated. The FM modulated signal is applied from the FM modulator 115 to a transmitter 116, and thereafter to an aerial 118 through an antenna coupler 117. The radio signal thus transmitted arrives at the slave telephone units S1, S2, . . . Sn. A radio signal transmitted from a slave telephone unit is received through the antenna coupler 117 by a receiver 119. The received signal is applied from the receiver 119 to an FM demodulator 120 where it is FM demodulated. The FM demodulated signal is applied from the FM demodulator 120 through a bandpass filter 129 to a speaker-amplifier 121 where it is amplified and is thereafter transmitted to the speaker 113.

The parent telephone unit also includes a control circuit 124 employing a digital computer to have a stored program control. The control circuit 124 receives information from the signal receipt line and controls the signal transmission line. For this purpose, the control circuit 124 receives a carrier detection signal indicative of the presence of conversation on this telephone line from the receiver 119, an automatic answer signal or a called-person's answer signal from the FM demodulator 120, and a speed quality monitor signal through a low pass filter 130 from the FM demodulator 120. The control circuit 124 also receives an interference detection signal from an interference detection circuit 123 when interference occurs. The interference detection circuit 123 is arranged in the connection from the receiver 119 to the control circuit 124 for producing the interference detection signal indicative of the presence of interference of radio signals transmitted from a plurality of slave telephone units. The control circuit 124 has functions of controlling the gain of the microphone amplifier 114, producing a call signal and an interference detection signal to the FM modulator 115, producing a speech quality control signal through a low pass filter 128 to the adder 127, and turning on and off the transmitter 116. In addition, the control circuit 124 specifies a frequency used in the communication and produces a frequency command signal to cause a frequency synthesizer 122 to control the FM modulator 115 in such a manner as to make the communication at a frequency specified by the control circuit 124. It is to be noted that the components 127, 128 and 130 used in controlling the speech quality are optional.

Figure 3:
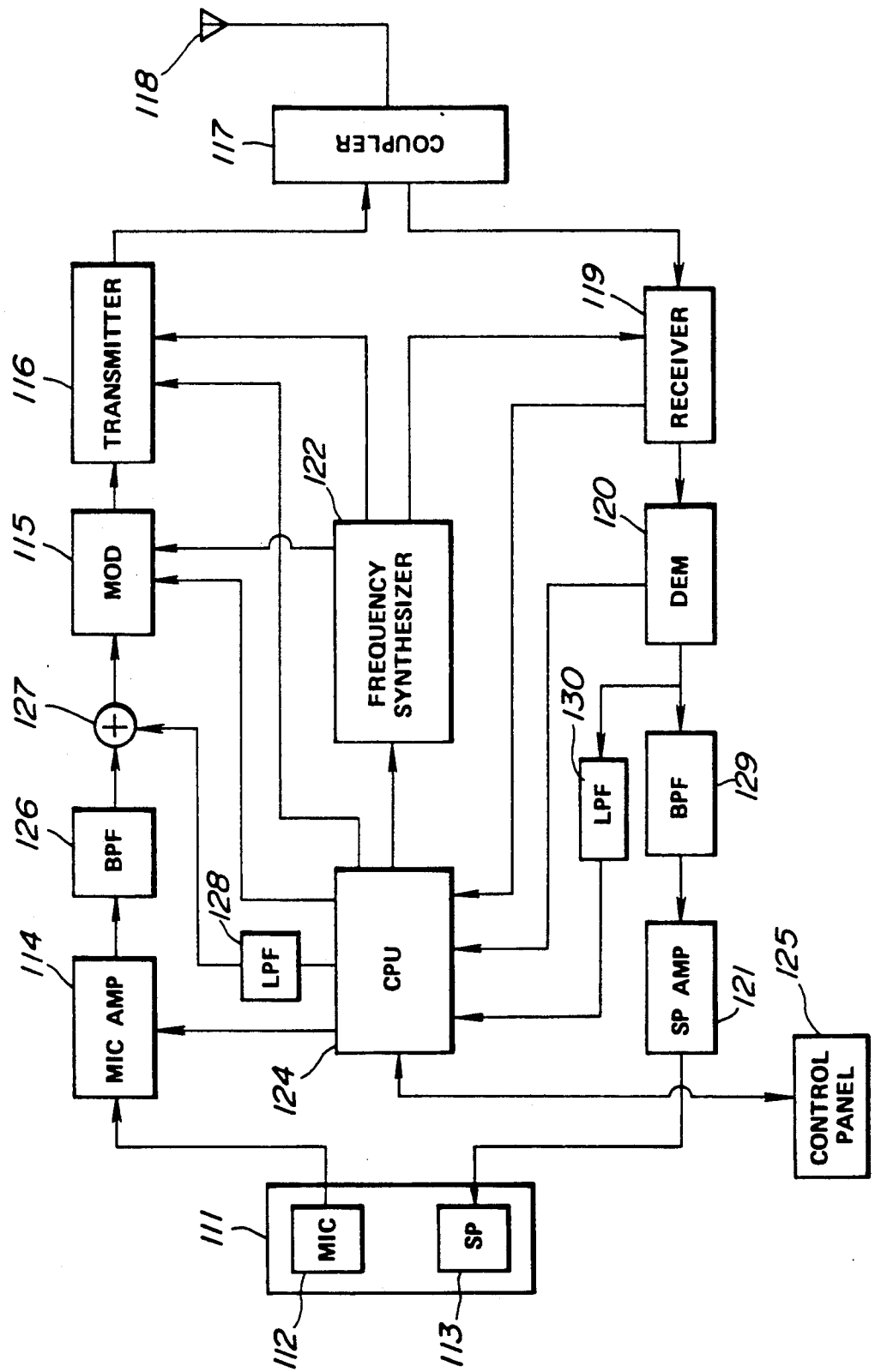
FIG. 3 is a block diagram showing the detailed arrangement of each of the slave telephone units used in the cordless telephone system.

FIG. 3 illustrates the detailed arrangement of each of the slave telephone units S1, S2, . . . Sn. The arrangement of FIG. 3 utilizes a number of the components previously described, and like reference numerals in FIG. 3 indicate like parts as described with reference to FIG. 2. The chief difference between the parent and slave telephone units is in that the interference detection circuit 123 is removed and a control panel 125 communicates with the control circuit 124.

Figure 4:
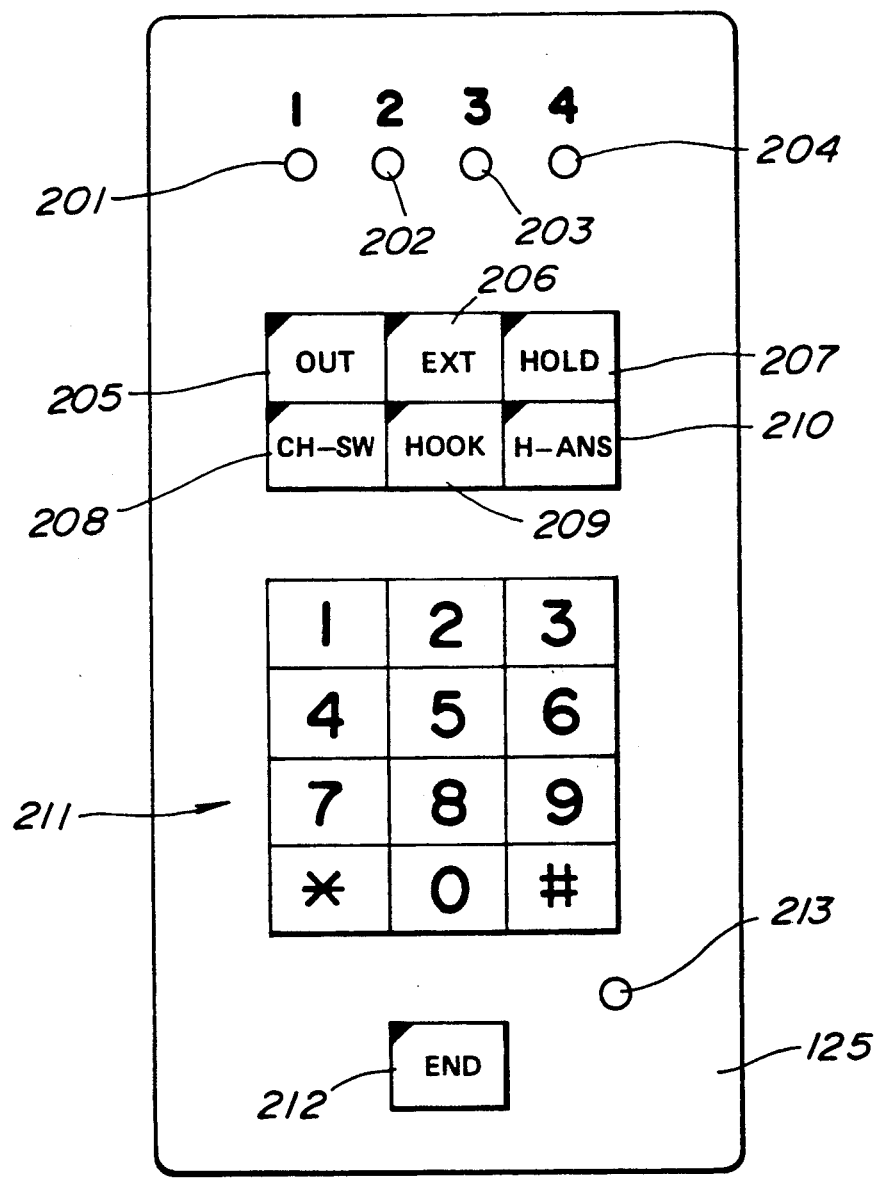
FIG. 4 is a plan view of the control panel provided for each of the slave telephone units.

Referring to FIG. 4, the control panel 125 is shown as including four busy indicators 201 to 204. Each of the busy indicators 201 to 204 will come on when the corresponding telephone line is held and will come on and off when the corresponding telephone line is busy. The control panel 125 also includes an outside line pushbutton 205, an extension pushbutton 206, a hold pushbutton 207, a channel switch pushbutton 208, a hook pushbutton 209, a hold answer pushbutton 210, and a keyboard 211. The keyboard 211 includes pushbuttons used to enter a desired telephone number. The outside line pushbutton 205, labeled "OUT" is pushed to transmit a call to an outside line or to answer to a call from an outside line. The extension pushbutton 206, labeled "EXT" is used to transmit a call to another slave telephone unit or to answer to a call from another slave telephone unit. The hold pushbutton 207, labeled "HOLD" is used to temporarily hold the conversation through an outside line. The channel switch pushbutton 208, labeled "CH-SW" is used to select another channel when interference occurs. The hook pushbutton 209, labeled "HOOK" is used to temporarily hook the telephone line. The hold answer pushbutton 209, labeled "H-AND" is used to answer to the held outside line while pushing dial buttons of the keyboard 211 corresponding to the number of the outside line. Each of the pushbuttons 205 to 210 contains a light which comes on when the corresponding pushbutton is pushed. When the conversation continues, a light 213 comes on. An end pushbutton 212, labeled "END" is used to terminate the conversation.

Figure 5:
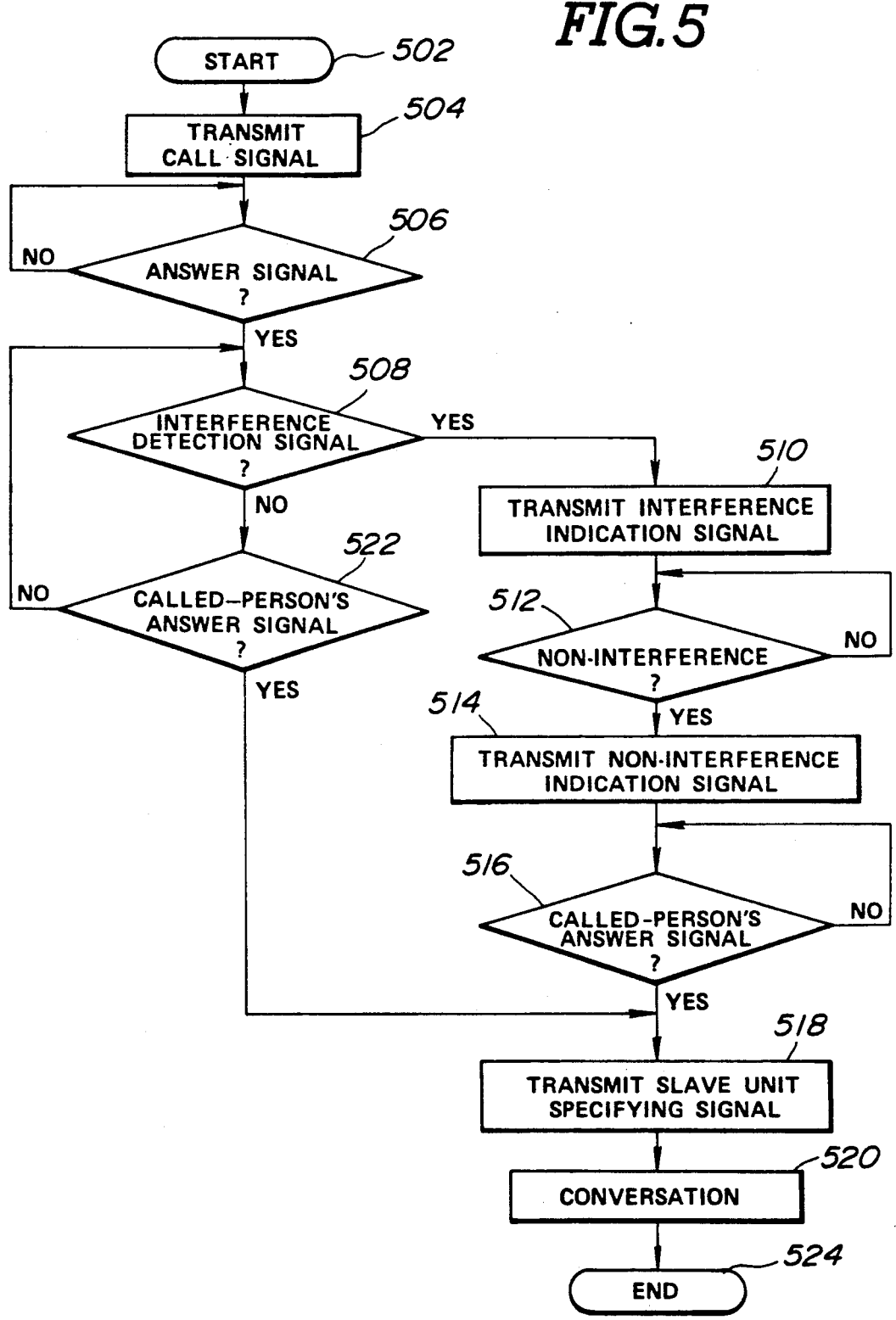
FIG. 5 is a flow diagram illustrating the programming of the digital computer included in each of the slave telephone units of the cordless telephone system.

FIG. 5 is a flow diagram illustrating the programming of the digital computer 124 included in each of the parent telephone units P1, P2, . . . Pm as it is used to control the corresponding parent telephone unit for transmitting a call to the slave telephone units S1, S2, . . . Sn. It is now assumed that each of the parent telephone units includes the functions of the available channel detection unit 106 and the control unit 107 and that the first slave telephone unit S1 is a representative slave telephone unit.

The computer program is entered at the point 502. At the point 504 in the program, a call signal is transmitted to call one of the slave telephone units. For this purpose, the digital computer 124 searches for an available channel, selects a carrier frequency corresponding to the found available channel for the modulator 115, and causes the transmitter 116 to transmit the modulated call signal through the antenna coupler 117 to the aerial 118.

At the point 506 in the program, a determination is made as to whether or not the parent telephone unit receives an automatic answer signal from the representative slave telephone unit S1. The representative slave telephone unit S1 is arranged to automatically transmit an answer signal when it receives a call signal transmitted from the parent telephone unit. If the answer to this question is "no", the program returns to the point 506. This operation is repeated until the answer to this question is changed to "yes".

At the point 508 in the program, another determination is made as to whether or not interference occurs. To make this determination, the digital computer 124 employs the interference detection signal fed from the interference detection circuit 123. If the answer to this question is "yes", then it means that at least one of the handsets 111 of the slave telephone units S2, S3, . . . Sn is in the off-hook position causing transmission of a called-person's answer signal from the corresponding slave telephone unit (in this case S2) and this called-person's answer signal interferes with the automatic answer signal automatically transmitted from the representative slave telephone unit S1, and the program proceeds to the point 510. At the point 510, an interference indication signal is produced and transmitted from the parent telephone unit to the slave telephone unit S2. The slave telephone unit S2 responds to the interference indication signal transmitted from the parent telephone unit automatically by interrupting the transmission of the called-person's answer signal in order to avoid the interference. Similarly, the representative slave telephone unit S1 stops the generation of the automatic answer signal in response to the interference indication signal transmitted from the parent telephone unit.

At the point 512 in the program, a determination is made as to whether or not the interference detection circuit 123 stops the generation of the interference detection signal. If the answer to this question is "no", then the program returns to the point 512. This operation is repeated until the answer is changed to "yes". At the point 514 in the program, a non-interference indication signal is transmitted from the parent telephone unit. These steps at the points 512 and 514 may be removed from the program if the slave telephone units S2, S3, . . . Sn except for the representative slave telephone unit S1 are arranged to transmit the called-person's answer signal only within a predetermined length of time after the receipt of the call signal transmitted from the parent telephone unit P. Each of the slave telephone units S2, S3, . . . Sn is arranged to restart the transmission of the called-person's answer signal in response to the non-interference indication signal transmitted from the parent telephone unit or automatically a predetermined length of time after it receives the interference indication signal.

At the point 516 in the program, a determination is made as to whether or not a called-person's answer signal is received from the slave telephone unit S2. If the answer to this question is "no", then the program returns to the point 516. This operation is repeated until the answer is changed to "yes". It is to be noted that each of the slave telephone units S1, S2, . . . Sn is arranged to transmit a called-person's answer signal including information specifying the slave telephone unit S2 from which the called-person's answer signal is transmitted.

At the point 518 in the program, the digital computer responds to the slave telephone unit specifying information by transmitting a signal to specify the slave telephone unit S2. At the point 520 in the program, the digital computer permits conversation between the parent telephone unit and the specified slave telephone unit S2. It is inhibited to bring the other slave telephone units S1, S3, S4, . . . Sn into communication with the parent telephone unit. When the conversation is completed, the handset is placed in the on-hook position.

If the answer to the question inputted at the point 508 is "no", then the program proceeds to another determination step at the point 522. This determination is as to whether or not a called-person's answer signal is received from the representative slave telephone unit S1. The representative slave telephone unit S1 transmits a called-person's answer signal including information specifying that this called-person's answer signal is transmitted from the representative slave telephone unit S1 when its handset 111 is in the off-hook position. If the answer to this question is "no", then the program returns to the point 508. If the answer to the question inputted at the point 522 is "yes", then the program proceeds to the point 518 where the digital computer transmits a signal to specify the representative slave telephone unit S1 for communication with the parent telephone unit.

Figure 6:
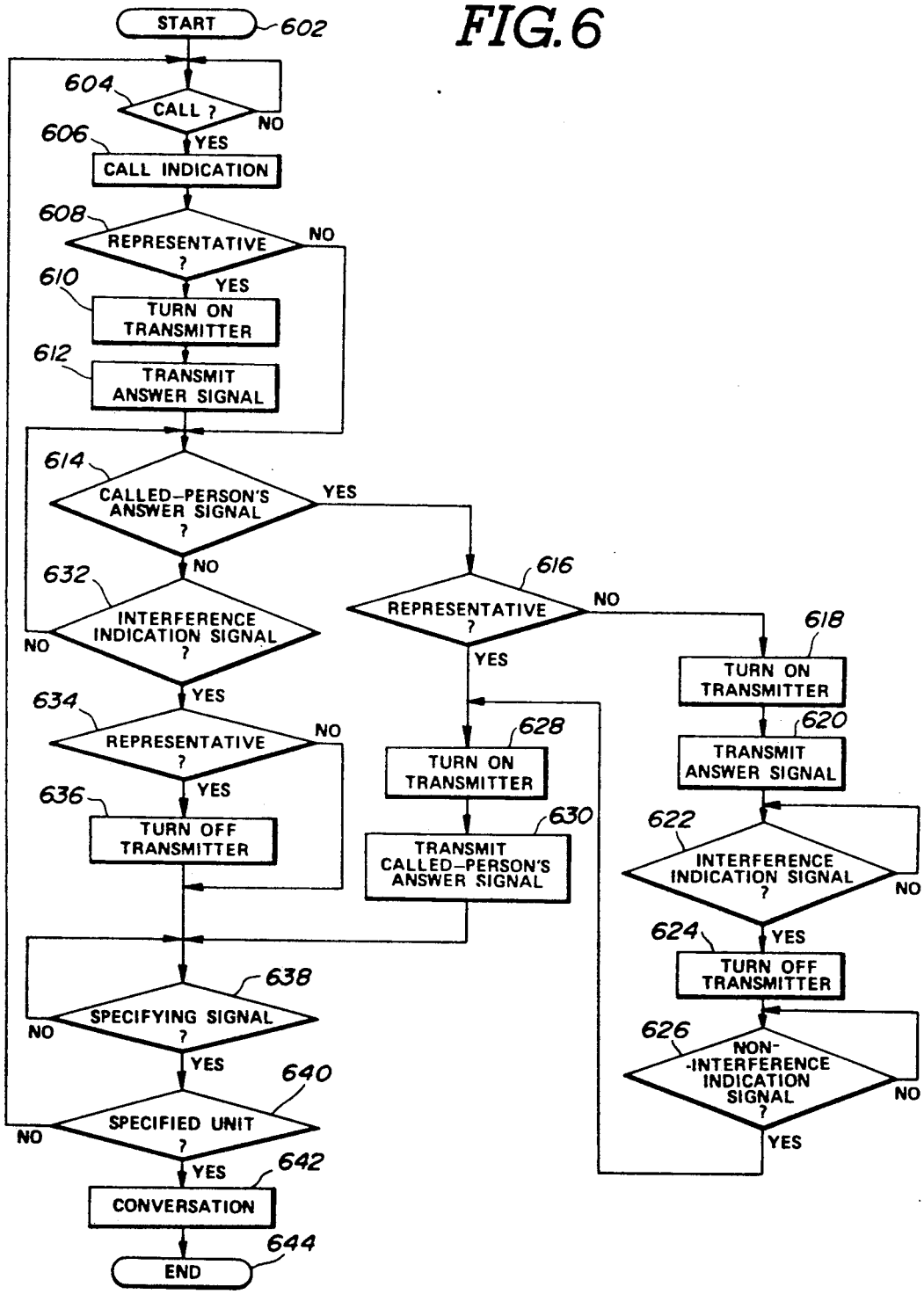

FIG. 6 is a flow diagram illustrating the programming of the digital computer included in each of the slave telephone units S1, S2, . . . Sn as it is used to control the corresponding slave telephone unit in response to a call signal transmitted from a parent telephone unit.

The computer program is entered at the point 602. At the point 604 in the program, a determination is made as to whether or not the slave telephone unit receives a call signal transmitted from a parent telephone unit. If the answer to this question is "no", then the program returns to the point 604. This operation is repeated until the answer changes to "yes".

At the point 606 in the program, an audio or light indication is provided to indicate the receipt of a call to persons around the slave telephone unit. At the point 608 in the program, a determination is made as to whether or not the present unit is the regenerative slave telephone unit S1. If the answer to this question is "yes", then it means that the slave telephone unit is the representative unit S1 and the program proceeds to the point 610. Otherwise, the program jumps to the point 612. At the point 610, the digital computer turns on the transmitter 106. At the following point 612, an answer signal is transmit from the representative slave telephone unit S1. As described previously, the representative slave telephone unit S1 has a function of transmitting an answer signal automatically in response to a call signal transmitted from a parent telephone unit. Following this, the program proceeds to the point 614.

At the point 614 in the program, a determination is made as to whether or not the handset 111 is in its off-hook position. A called-person's answer signal is transmitted when the handset is in the off-hook position. The called-person's answer signal includes information specifying which slave telephone unit transmits the called-person's answer signal. If the answer to this question is "yes", then the program proceeds to another determination step at the point 616. This determination is as to whether or not the present unit is the representative slave telephone unit S1. If the answer to this question is "yes", then the program proceeds to the point 628. Otherwise, the program proceeds to the point 618 where the transmitter 106 is turned on. At the point 620 in the program, an answer signal is transmitted from the slave telephone unit. Following this, the program proceeds to another determination step at the point 622. This determination is as to whether or not the slave telephone unit receives an interference indication signal from the parent telephone unit. If the answer to this question is "no", then the program returns to the point 622. This operation is repeated until the answer changes to "yes". If the answer to the question inputted at the point 622 is "yes", then it means that the answer signal transmitted from the present slave telephone unit interferes with the answer signal transmitted from the representative slave telephone unit S1 and the program proceeds to the point 624 where the digital computer turns off the transmitter 106 to stop the transmission of the answer signal temporarily. At the point 626 in the program, a determination is made as to whether or not the slave telephone unit receives a non-interference indication signal from the parent telephone unit. If the answer to this question is "no", then the program returns to the point 626. This operation is repeated until the answer changes to "yes". If the answer to the question inputted at the point 626 is "yes", then the program proceeds to the point 628. These steps at the points 624 and 626 may be removed from the program if the steps at the points 512 and 514 are removed from the program used to control each of the parent telephone units.

At the point 628 in the program, the digital computer turns on the transmitter. Thereafter, the program proceeds to the point 630 where the called-person's answer signal is transmitted, the called-person's answer signal having information specifying the number of the present slave telephone unit. Following this, the program proceeds to the point 638.

If the answer to the question inputted at the point 614 is "no", then it means that the handset 111 of the slave telephone unit is in its on-hook position and the program proceeds to another determination step at the point 632. This determination is as to whether or not an interference indication signal is transmitted from the parent telephone unit. If the answer to this question is "yes", then the program proceeds to the point 634. Otherwise, the program returns to the point 614.

At the point 634 in the program, a determination is made as to whether or not the present unit is the regenerative slave telephone unit S1. If the answer to this question is "yes", then the program proceeds to the point 636 where the transmitter is turned off. Otherwise, the program jumps to the point 638. At the point 638 in the program, a determination is made as to whether or not the slave telephone unit receives a signal transmitted from the parent telephone unit, this signal specifying a slave telephone unit. As described previously, the parent telephone unit has a function of transmitting a slave telephone unit specifying signal in response to a called-person's answer signal having information specifying the slave telephone unit from which the called-person's answer signal is transmitted. If the answer to this question is "no", then the program returns to the point 638. This operation is repeated until the answer changes to "yes". Following this, the program proceeds to the point 640 where a determination is made as to whether or not the present unit is the slave telephone unit specified by the slave telephone unit specifying signal transmitted from the parent telephone unit. If the answer to this question is "yes", then the program proceeds to the point 642 where conversation is permitted between the parent telephone unit and the specified slave telephone unit. Otherwise, the program returns to the point 604.

It can be seen that the "no" line extending from the point 634 to the point 638 may be replaced with a "no" line extending from the point 634 to the point 604.

As can be seen from the forgoing that, in this embodiment, only the representative slave telephone unit S1 transmits an automatic answer signal in response to a call signal transmitted from a parent telephone unit. If the representative slave telephone unit S1 transmits a off-hook or called-person's answer signal at a time earlier than the other slave telephone units S2, S3, ... Sn, conversation will be allowed between the parent telephone unit and the representative slave telephone unit.

Figure 7:
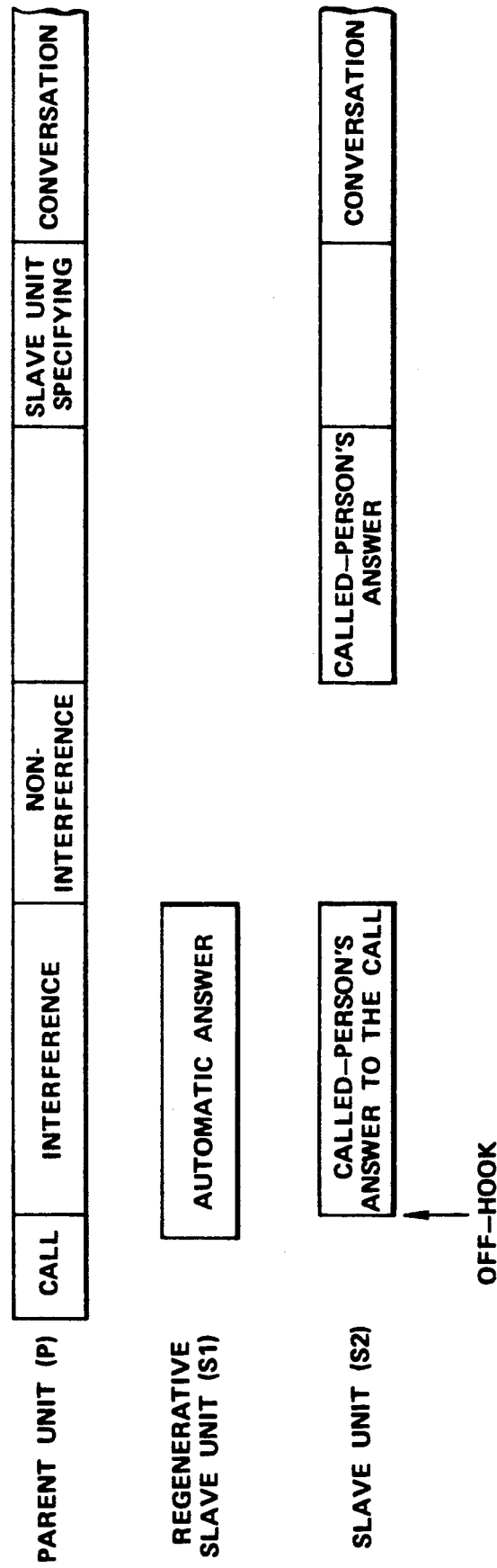
FIG. 7 is a diagram used in explaining the operation of the cordless telephone system of the invention where one of the slave telephone units transmits a called-person's answer signal at a time earlier than the representative slave telephone unit.

Referring to FIG. 7, description is made to the case where another slave telephone unit (for example, S2) transmits an off-hook or called-person's answer signal at a time earlier than the representative slave telephone unit S1. When a call signal is transmitted from a parent telephone unit, the regenerative slave unit S1 transmits an automatic answer signal. If the slave telephone unit S2 transmits a called-person's answer signal at a time earlier than the representative slave telephone unit S1, the called-person's answer signal will interfere with the automatic answer signal transmitted from the regenerative slave unit S1. The parent telephone unit detects this interference and transmits an interference indication signal. The representative slave unit S1 stops the transmission of the automatic answer signal in response to the interference indication signal, whereas the slave telephone unit S2 stops the transmission of the called-person's answer signal in response to the interference indication signal. As a result, the interference between the automatic answer signal and the called-person's answer signal disappears. The parent telephone unit detects this condition and transmits a non-interference indication signal. The slave telephone unit resumes the transmission of the called-person's answer signal in response to the non-interference indication signal. The called-person's answer signal includes information specifying the slave telephone unit S2 from which the called-person's answer signal is transmitted. The parent telephone unit specifies the slave telephone unit S2 to permit conversation between the parent telephone unit and the slave telephone unit S2.

As described above, only the representative slave telephone unit S1 transmits an automatic answer signal in response to a call signal transmitted from a parent telephone unit. If the representative slave telephone unit S1 transmits an off-hook or called-person's answer signal at a time earlier than the other slave telephone units S2, S3, ... Sn, radio communication will be established between the parent telephone unit and the representative slave telephone unit. If one of the slave telephone units S2, S3, ... Sn except for the representative slave telephone unit S1 transmits a called-person's answer signal, interference will occur between this called-person's answer signal and the automatic answer signal transmitted from the representative slave telephone unit S1. The parent telephone unit detects the interference and permits radio communication with the slave telephone unit producing the called-person's answer signal. Accordingly, the parent telephone unit transmitting a call signal to all of the slave telephone units can be placed into radio communication with only a slave telephone unit which transmits a called-person's answer signal in response to the call signal transmitted from the parent telephone unit. It is, therefore, apparent that the cordless telephone system of the invention is free from the interference problems associated with the conventional systems.

There has been an increasing demand for improved cordless telephone systems which includes a plurality of slave telephone units shearing a plurality of telephone lines rather than a single telephone line. In order to satisfy such a demand, it may be considered to arrange the present cordless telephone system as follows:

The cordless telephone system includes a number ($3 \times 1$) of slave telephone units utilizing a number (l) of outside lines EL1 to EL through a number (m) of parent telephone units. The slave telephone units are divided into a number (l) of groups of three slave telephone units utilizing a corresponding outside line. That is, the first slave telephone unit group utilizes the first outside line 1, the second slave telephone unit group utilizes the second outside line 2, and so on. For example, when an incomming call is transmitted through the first outside line 1, one of the slave telephone units included in the first group can answer to the incomming call. One of the slave telephone units included in each of the slave telephone unit groups is assigned as a representative slave telephone unit.

It is now assumed that an incomming call is transmitted through the outer line EL1. A parent telephone unit transmits an incomming call receipt signal including information specifying the outside line EL1 through which the incomming call is transmitted and information specifying the representative slave telephone unit S1-1 included in the first group corresponding to the outside line EL1.

Each of the slave telephone units receives the incomming call receipt signal and makes a determination as to whether or not it is included in the group corresponding to the specified outside line EL1 and another determination as to whether or not it corresponds to the specified representative slave telephone unit. Only the slave telephone unit S1-1 satisfies these conditions and transmits an automatic answer signal. Thereafter, radio communication is established between the slave telephone unit S1-1 and the outside line EL1 in such a manner as described previously. The other slave telephone units return to a waiting condition.

The cordless telephone system, which has a number of slave telephone units divided into a plurality of groups, is free from such a problem that all of the slave telephone units can perform no operation except for called-person's answer when an incomming call is transmitted through an outside line. That is, the slave telephone units included in the groups other than the group corresponding to the outside line through which an incomming call is transmitted are not placed into a busy condition and they can answer to an incomming call transmitted through another outside line, transmits a call to an extension, answer to a call from an extension, and transmit a call to an outside line.

With such a cordless telephone system, however, the following problems are associated. First, the slave telephone unit groups correspond to respective outside lines. When an incomming call is transmitted through an outside line, the slave telephone units except for the slave telephone units included in the group corresponding to the outside line through which the incomming call is transmitted cannot be placed into communication with the outside line. This requires for the caller to recall to a desired slave telephone unit with a dial number corresponding to another group including the desired slave telephone unit if the desired slave telephone unit is included in the former group. In addition, when an incomming call is transmitted through an outside line, until one of the slave telephone units included in the group corresponding to the outside line is placed into conversation with the outside line, the other slave telephone units included in the same group can perform no operation except for incomming call receipt operation. This is serious particularly when one group includes several tens of slave telephone units.

Figure 8A:
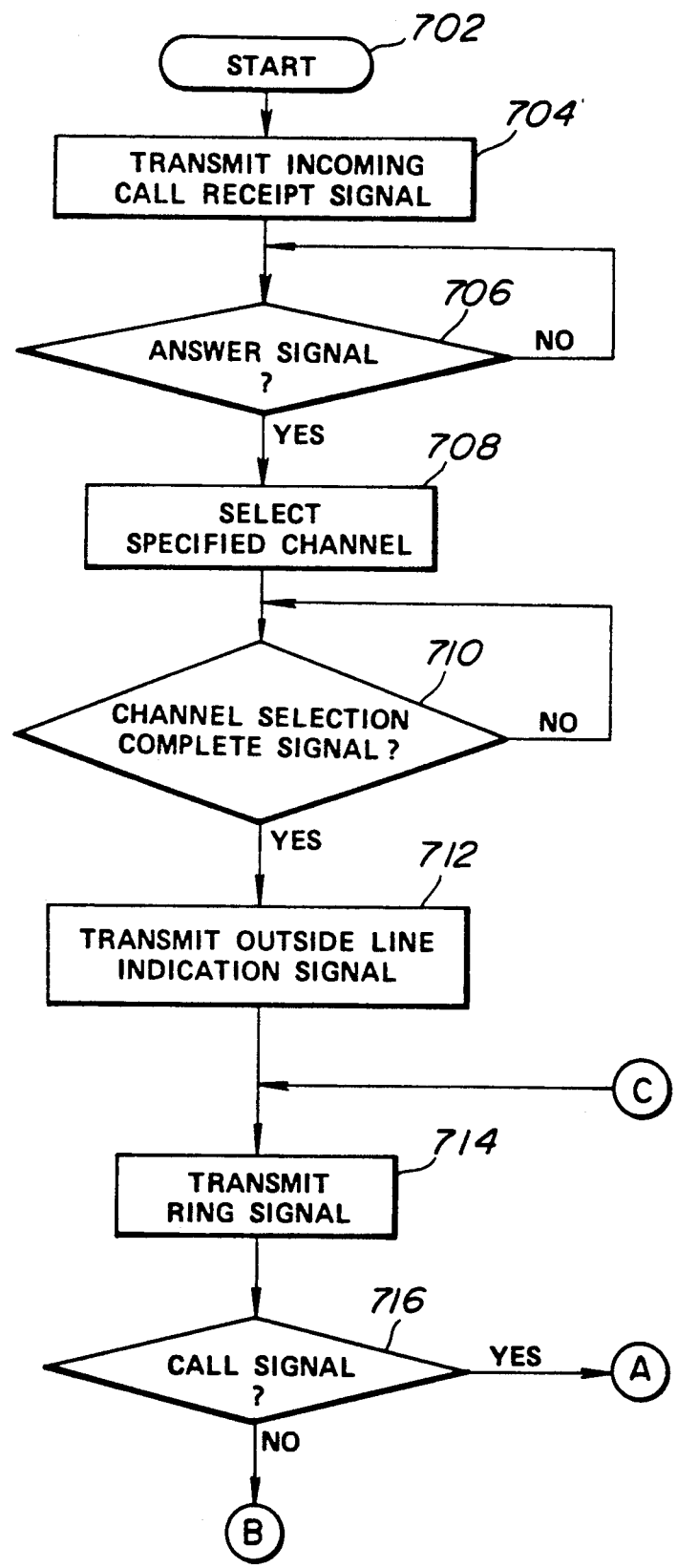
FIGS. 8A to 8C are flow diagrams illustrating the programming of the digital computer included in the control station.
Figure 8B:
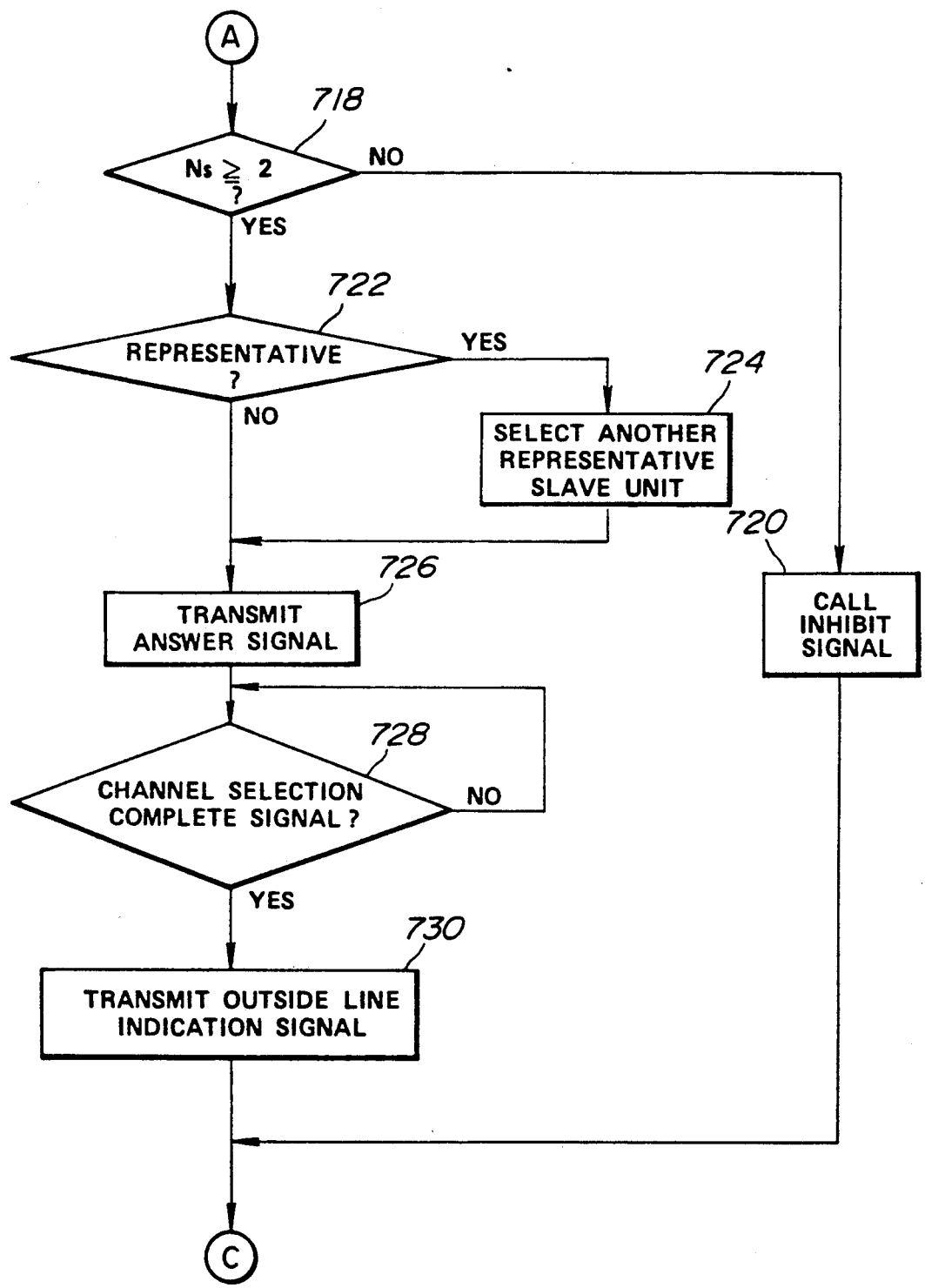
Figure 8C:
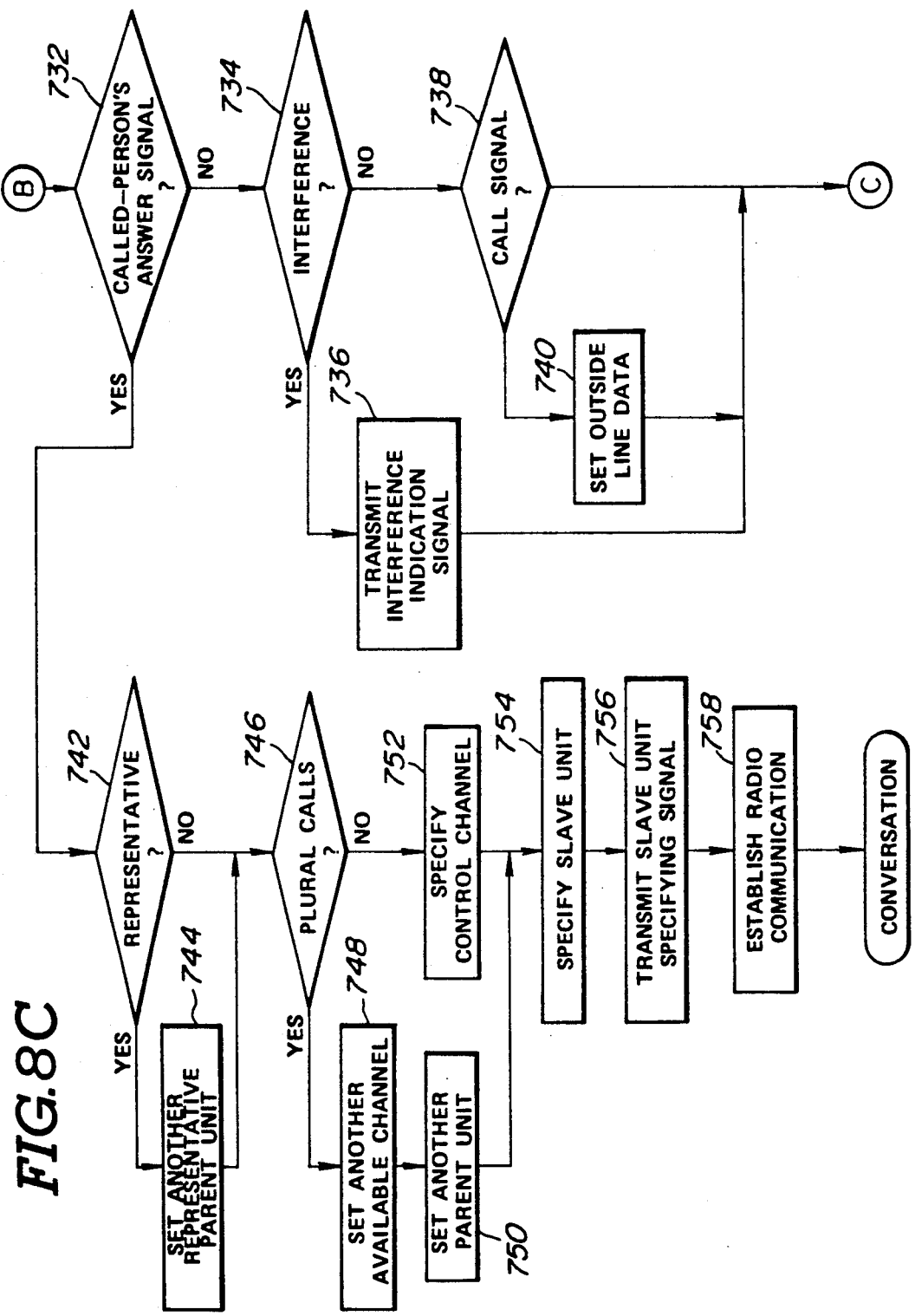
Figure 9A:
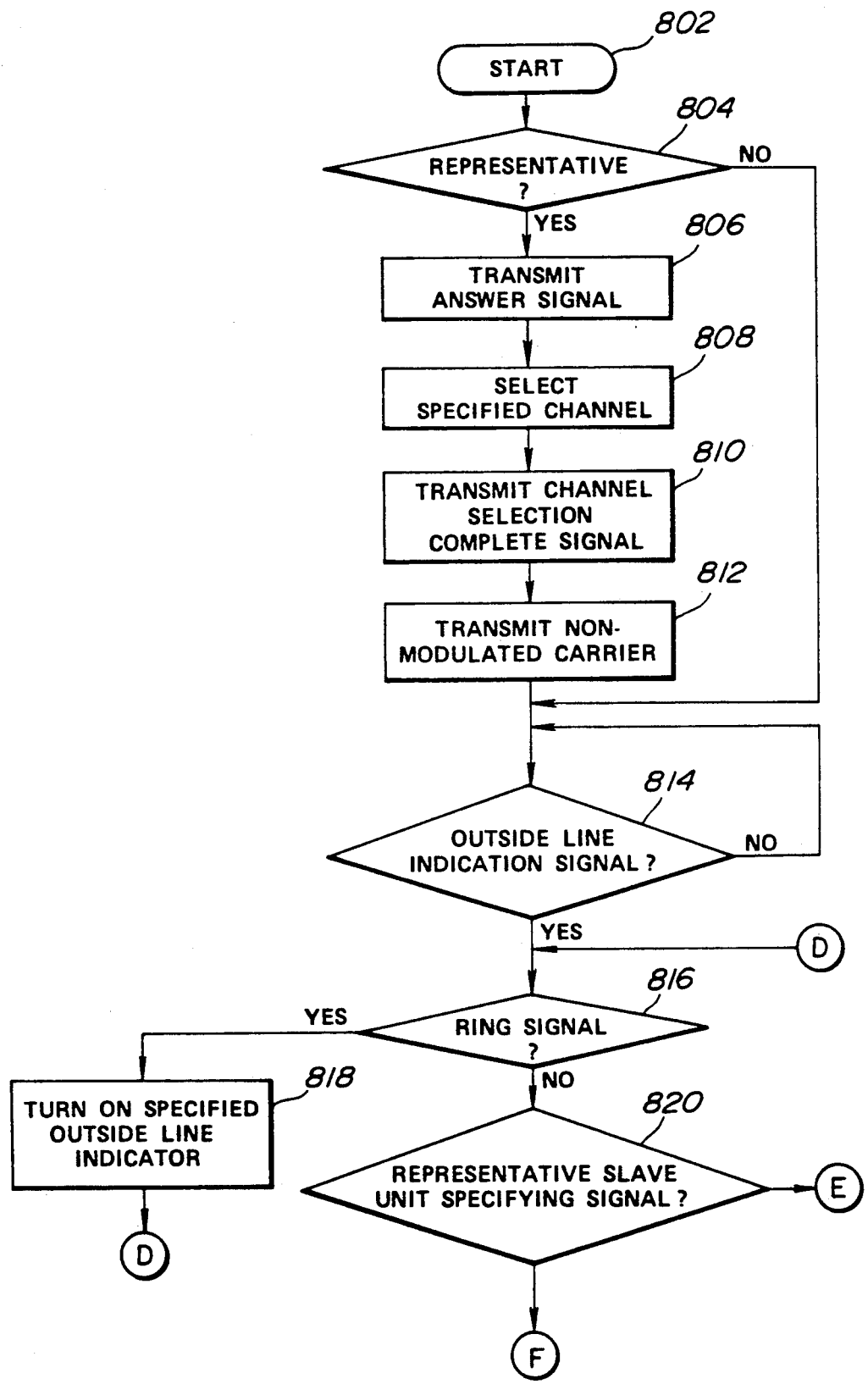
FIGS. 9A to 9C are flow diagrams illustrating the programming of the digital computer included in each of the slave telephone units.
Figure 9B:
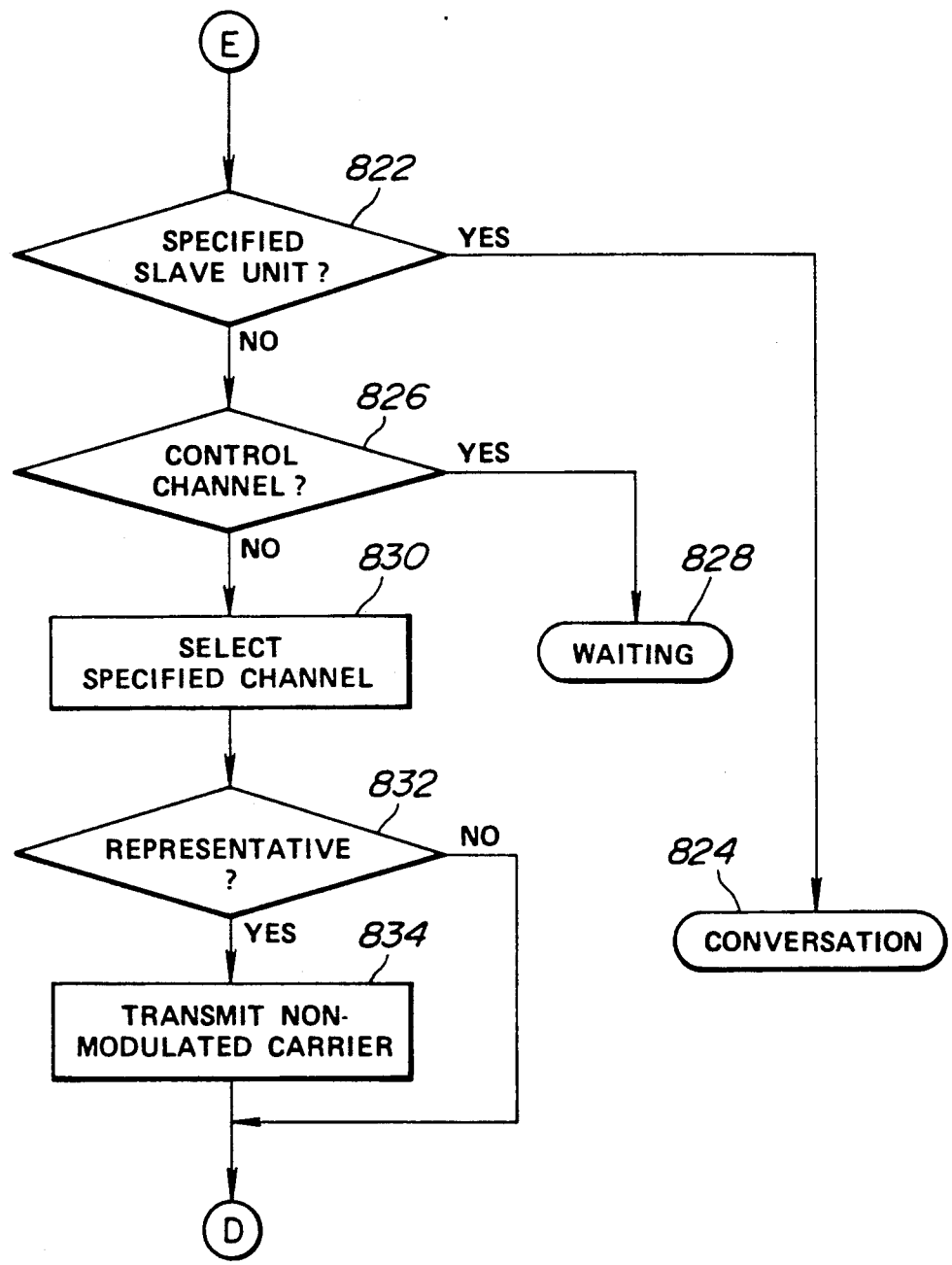
Figure 9C:
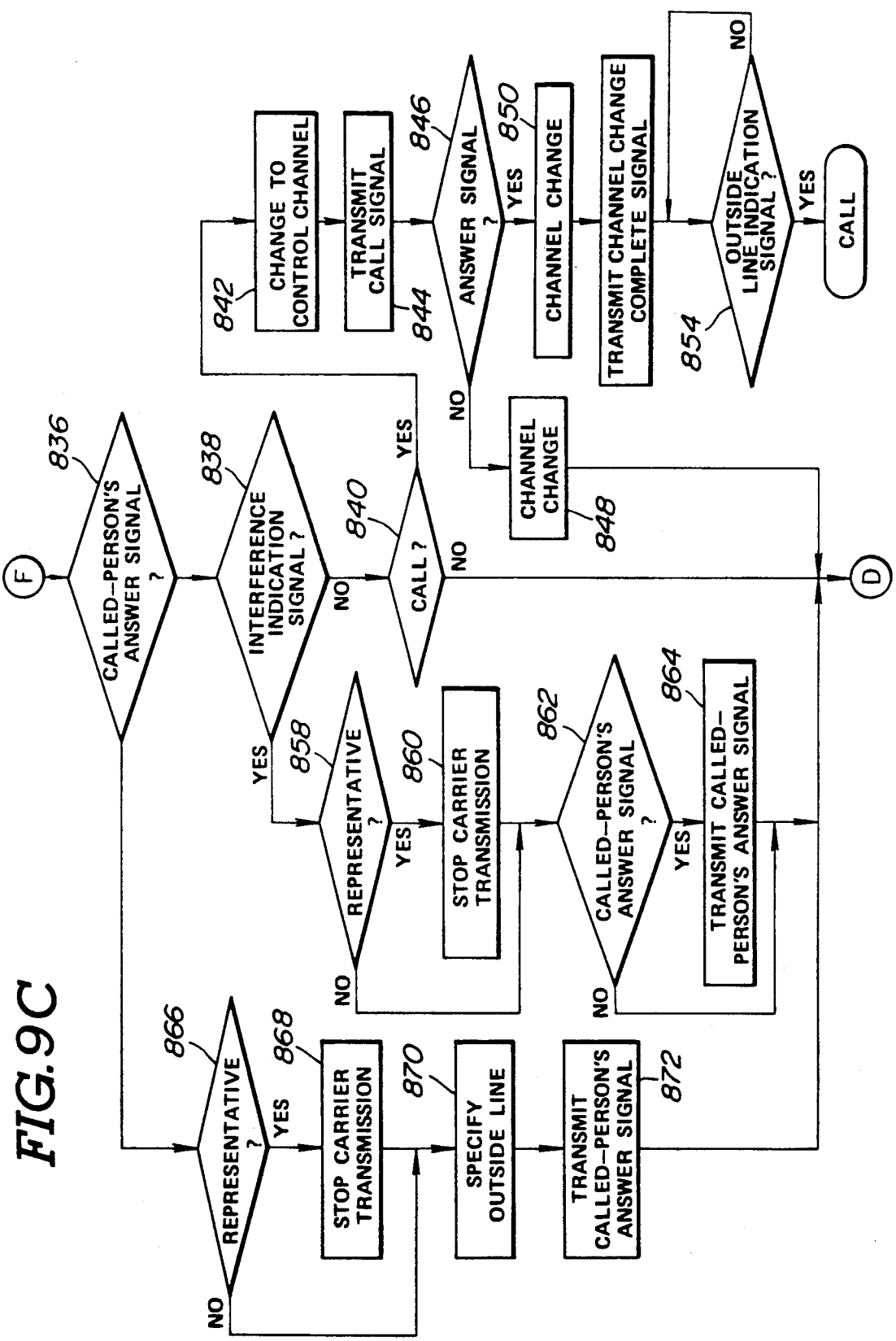
Figure 10:
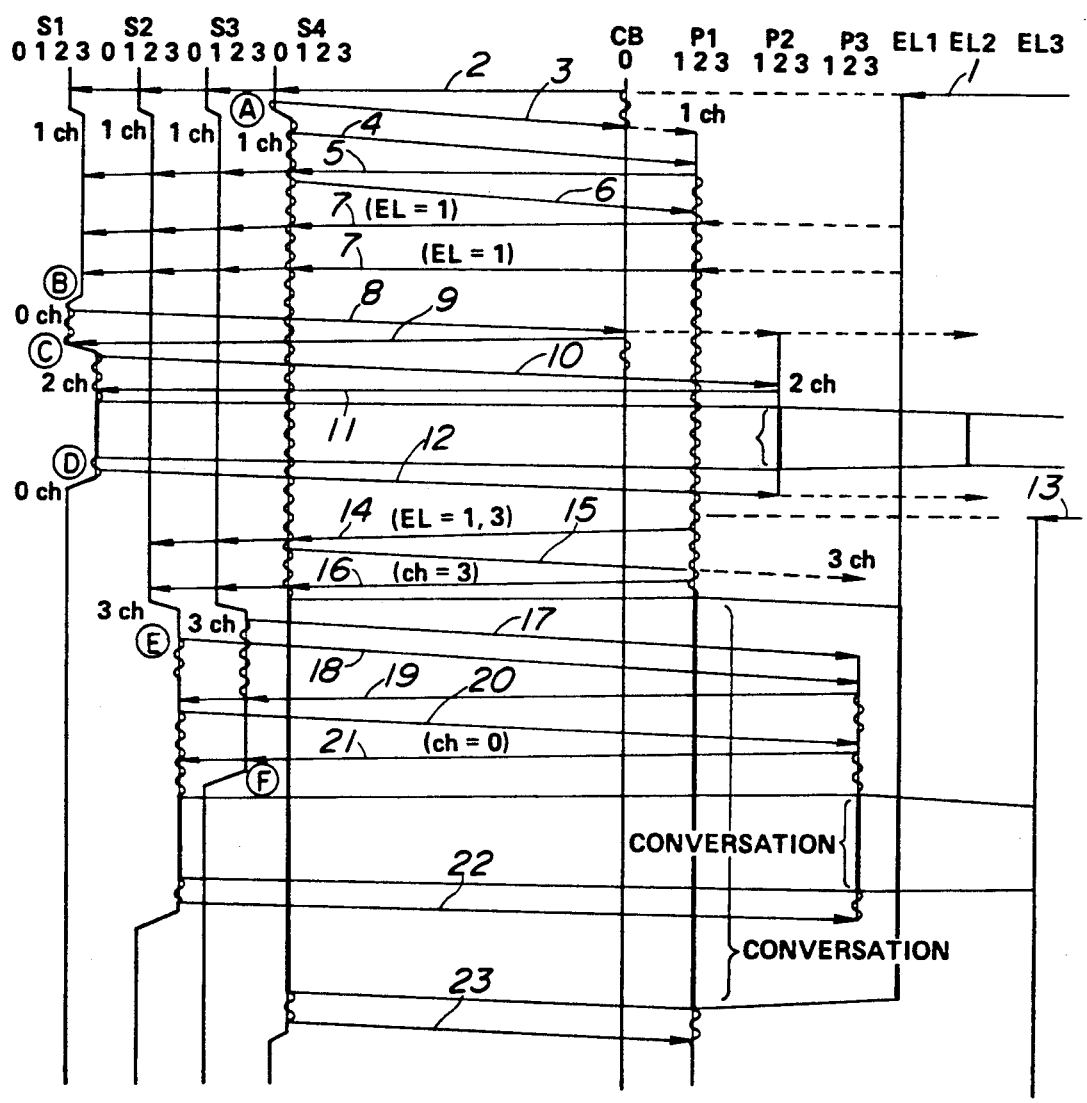
FIG. 10 is a diagram used in explaining the operation of the cordless telephone system.

Referring to FIGS. 8, 9 and 10, description will be made to an advantageous manner to solve the problems without division of the slave telephone units into groups.

FIG. 8 is a flow diagram illustrating the programming of the digital computer included in the control station as it is used to control the parent telephone units when it receives an incomming call through an outside line.

The computer program is entered at the point 702 when an incomming call is transmitted through an outside line. At the point 704 in the program, the digital computer provides a command causing the control unit (CB) 107 to transmit an incomming call receipt signal including information indicating a telephone number to specify a regenerative slave telephone unit and a channel number to specify a channel for use in conversation. Only the specified regenerative slave telephone unit (in this case S4) responds to the incomming call receipt signal automatically by transmitting an answer signal through the control channel. In addition, the slave telephone units S1, S2, S3 and S4 select the specified channel in response to the incomming call receipt signal transmitted from the control unit (CB) 107. At the point 706 in the program, a determination is made as to whether or not the control unit (CB) 107 receives the automatic answer signal. If the answer to this question is "no", then the program returns to the point 706. This operation is repeated until the answer changes to "yes".

At the point 708 in the program, a command is provided to select the specified channel. Following this, a determination is made at the point 710. This determination is as to whether or not a channel selection complete signal is received through the specified channel. If the answer to this question is "no", then the program returns to the point 710. This operation is repeated until the answer changes to "yes".

At the point 712 in the program, the parent telephone unit transmits an outside line indication signal including information indicating the number of the outside line through which the present call has been transmitted. When the slave telephone units S1, S2, S3 and S4 receive the outside line indication signal, their respective busy indicators corresponding to the outside line come on and off.

At the point 714 in the program, the parent telephone unit transmits the ring signal transmitted through the specified channel. The ring signal is transmitted to the parent telephone unit through the outside line. At the point 716 in the program, a determination is made as to whether or not a call signal is received from either of the slave telephone units. Such a call signal is transmitted from a slave telephone unit when the user pushes the end pushbutton 212 or the outside line pushbutton 205. The result is that the channel for the slave telephone unit is changed to the control channel through which the control unit 107 receives the call signal. If the answer to this question is "yes", then it means that the control unit 107 receives the call signal and the program proceeds to another determination step at the point 718. This determination is as to whether or not two or more slave telephone units are receiving call signals. If the answer to this question is "no", then it means that no slave telephone unit can receive a call signal and the program proceeds to the point 720 where the control section 100 transmits a call inhibit signal to inhibit the call transmission operation of the slave telephone units. Following this, the program returns to the point 714.

If the answer to the question inputted at the point 718 is "yes", then the program proceeds to another determination step at the point 722. This determination is as to whether or not the representative slave telephone unit is receiving the call signal. If the answer to this question is "yes", then the program proceeds to the point 724 where another representative slave telephone is selected and specified for receipt of the call and then the program proceeds to the point 726 otherwise, the program proceeds directly to the point 726.

At the point 726 in the program, the digital computer provides a command causing the control unit 107 to transmit an answer signal including information specifying a new channel. When the slave telephone units included in the group including the representative slave telephone unit newly specified at the point 726 receive this answer signal from the control unit 107, they changes the channel to the specified channel. Thereafter, the newly specified representative slave telephone unit transmits a channel selection complete signal. At the point 728 in the program, a determination is made as to whether or not another parent telephone unit receives the channel selection complete signal. If the answer to this question is "no", then the program returns to the point 728. This operation is repeated until the answer changes to "yes". At the point 730 in the program, the another parent telephone unit transmits an outside line indication signal including information indicating the number of the outside line through which the present call is transmitted. Thereafter, the program proceeds to the point 714.

If the answer to the question inputted at the point 716 is "no", then the program proceeds to another determination step at the point 732. This determination is as to whether or not the control section 100 receives a called-person's answer signal. If the answer to this question is "yes", then it means that the user places the handset of a slave telephone unit into its off-hook position in response to the call signal and the program proceeds to the point 742. Otherwise, the program proceeds from the point 732 to another determination step at the point 734. This determination is as to whether or not interference occurs between the answer signal transmitted from the representative slave telephone unit and the called-person's answer signal transmitted from the slave telephone unit. To make this determination, the digital computer employs the interference detection signal fed from the interference detection circuit 123. If the answer to this question is "yes", then the program proceeds to the point 736 where an interference indication signal is transmitted and thereafter the program returns to the point 714.

If the answer to the question inputted at the point 734 is "no", then the program proceeds to the point 738 where a determination is made as to whether or not the control section 100 receives a new call signal. If the answer to this question is "yes", then the program proceeds to the point 740 where the digital computer sets outside-line information including the number of the outside line through which the new call is received from a caller and thereafter the program proceeds to the point 714. Otherwise, the program returns directly from the point 738 to the point 714.

At the point 742 in the program, a determination is made as to whether or not the slave telephone unit transmitting the called-person's answer signal is the representative slave telephone unit. If the answer to this question is "yes", then the program proceeds to the point 744 where the digital computer sets information specifying another representative slave telephone unit and thereafter the program proceeds to the point 746. Otherwise, the program proceeds directly from the point 742 to the point 746.

At the point 746 in the program, a determination is made as to whether or not a plurality of calls are transmitted. If the answer to this question is "yes", then the program proceeds to the point 748 where the digital computer provides a command causing the available channel detection circuit 106 to detect another available channel and sets information indicating the detected available channel. At the point 750 in the program, the digital computer sets another parent telephone unit for use in conversation with the slave telephone unit. Following this, the program proceeds to the point 754. If the answer to the question inputted at the point 746 is "no", then the program proceeds to the point 752 where the channel is switched to the control channel (0ch) and thereafter the program proceeds to the point 754.

At the point 754 in the program, the digital computer sets information related to the slave telephone unit for use in conversation. At the following point 756, a signal specifying the slave telephone unit for conversation with the representative parent telephone unit. Following this, the program proceeds 758 where a radio communication is established between the outside line and the slave telephone unit.

As can be seen from the flow diagram of Fig. 8, a parent telephone unit transmits an incomming call receipt signal when it receives an incomming call. Thereafter, the parent telephone unit transmits a representative slave unit specifying signal in response to a called-person's answer signal transmitted from a slave telephone unit. If the parent telephone unit receives a called-person's answer signal transmitted from a representative slave telephone unit or a plurality of incomming calls, it specifies another representative slave telephone unit and transmits a representative slave unit specifying signal to specify the another slave telephone unit as a new representative representative slave unit.

FIG. 9 is a flow diagram illustrating the programming of the digital computer included in each of the slave telephone units as it is used to control the corresponding slave telephone unit when it receives an incomming call receipt signal transmitted from a parent telephone unit.

The computer program is entered at the point 802 in response to an incomming call receipt signal transmitted from a parent telephone unit when a call is transmitted through an outside line to the control unit 100. The incomming call receipt signal includes information indicating a telephone number to specify a representative slave telephone unit corresponding to the telephone number and a channel number to specify a channel corresponding to the channel number. At the point 804 in the program, a determination is made as to whether or not the slave unit is the regenerative slave telephone unit. If the answer to this question is "yes", then the program proceeds to the point 806 where the regenerative slave telephone unit transmits an answer signal. At the point 808 in the program, the cannel is switch to the specified channel. At the point 810, a channel selection complete signal is transmitted to the parent telephone unit. At the point 812 in the program, a non-modulated carrier is transmitted through the specified channel. Following this the program proceeds to the point 814. If the answer to the question inputted at the point 804 is "no", then the program proceeds directly to the point 814.

At the point 814 in the program, a determination is made as to whether or not an outside line indication signal is received from the parent telephone unit. If the answer to this question is "no", then the program returns to the point 814. This operation is repeated until the answer changes to "yes".

At the point 816 in the program, a determination is made as to whether or not a ring signal is received from the parent telephone unit. If the answer to this question is "yes", then the program proceeds to the point 818 where the light 201, which corresponds to the first outside line, comes on and off, and thereafter the program returns to the point 814. Otherwise, the program proceeds from the point 816 to another determination step at the point 820. This determination is as to whether or not a representative slave unit specifying signal is received from the parent telephone unit. This signal includes information indicating a telephone number to specify the slave telephone unit. If the answer to this question is "yes", then the program proceeds to the point 822. Otherwise, the program proceeds to the point 836.

At the point 822 in the program, a determination is made as to whether or not the present slave unit is specified by the received representative slave unit specifying unit. If the answer to this question is "yes", then the program proceed to the point 824 where conversation is permitted. Otherwise, the program proceeds to another determination step at the point 826. This determination is as to whether or not the control channel (0ch) is used at the present time. If the answer to this question is "yes", then the program proceeds to the point 828 where the operation returns into a waiting mode. Otherwise, the program proceeds to the point 830 where the channel is switched to the specified channel. Following this, the program proceeds to the point 832 where a determination is made as to whether or not the present slave unit is the specified representative slave telephone unit. If the answer to the question is "yes", then the program proceeds to the point 834 where a non-modulated carrier is transmitted through the specified channel, and thereafter the program returns to the point 816. Otherwise, the program returns directly from the point 832 to the point 816.

At the point 836 in the program, a determination is made as to whether or not a called-person's answer signal is transmitted from the present slave telephone unit. It is answer to this question is "no", then the program proceeds to another determination step at the point 838. This determination is as to whether or not an interference indication signal is received from the parent telephone unit. If the answer to this question is "yes", then it means that interference occurs between the non-modulated carrier transmitted from the representative slave telephone unit and a called-person's answer signal transmitted from another slave telephone unit and the program proceeds to the point 846. Otherwise, the program proceeds to another determination step at the point 840. This determination is as to whether or not a call is transmitted. If the answer to this question is "no", then the program returns to the point 816. Otherwise, the program proceeds to the point 842.

At the point 842 in the program, a channel change is made to the control channel (0ch). Thereafter, the program proceeds to the point 844 where a call signal is transmitted through the control channel (0ch) to the control unit 107. In response to this call signal, the digital computer causes the available channel detection unit 106 to search an available channel and assigns the searched available channel to another parent telephone unit. The control unit 107 transmits an answer signal including information indicating the new available channel. At the point 846 in the program, a determination is made as to whether or not the answer signal is received. If the answer to this question is "no", then the program proceeds to the point 848 where a channel change is made from the control channel to the first channel, and then the program returns to the point 816. If the answer to the question inputted at the point 846 is "yes", then the program proceeds to the point 850 where a channel change is made to the new available channel, and thereafter to the point 852 where a channel change complete signal is transmitted. This channel change complete signal is received through the new available channel by the another parent telephone unit which thereby transmits an outside line indication signal. At the point 854 in the program, a determination is made as to whether or not the outside line indication signal is received. If the answer to this question is "no", then the program returns to the point 854. This operation is repeated until the answer changes to "yes". At the point 856, the operation is placed into a call mode.

At the point 858 in the program, a determination is made as to whether or not the present slave unit is a representative slave telephone unit. If the answer to this question is "yes", then the program proceeds to the point 860 where the representative slave telephone unit stops the transmission of the non-modulated carrier, and thereafter the program proceeds to the point 862, Otherwise, the program proceeds directly from the 846 to the point 862. At the point 862, a determination is made as to whether or not the slave telephone unit transmits a called-person's answer signal. If the answer to this question is "yes", then the program proceeds to the point 864 where a called-person's answer signal is transmitted again, and thereafter the program returns to the point 816. Otherwise, the program returns directly from the point 62 to the point 816.

If the answer to the question inputted at the point 836 is "yes", then the program proceeds to another determination step at the point 866. This determination is as to whether or not the present slave unit is the specified representative slave telephone unit. If the answer to this question is "yes", then the program proceeds to the point 868 where the representative slave telephone unit stops the transmission of the non-modulated carrier, and thereafter the program proceeds to the point 870. Otherwise, the program proceeds directly from the point 866 to the point 870.

At the point 870 in the program, the user is requested to push the outline pushbutton 205 so as to specify the outside line for use in conversation. Following this, the program proceeds to the point 872 where the slave telephone unit transmits a called-person's answer signal, and thereafter the program returns to the point 816.

As can be seen from the flow diagram of FIG. 9, the slave telephone unit, which receives a call signal transmitted from a parent telephone unit, is placed into a call receipt mode regardless of the number of the outside line through which the call is transmitted. The representative slave telephone unit specified by the call signal and the representative slave telephone unit specifying signal transmits a non modulated carrier until it transmits a called-person's answer signal therefrom or until it receives a interference indication signal from the parent telephone unit. The slave telephone units except for the slave telephone unit which receives the representative slave telephone unit specifying signal make a channel change to the channel specified by the parent telephone unit. If the control channel is specified, however, the operation is placed into a waiting mode. When the user requests to transmit a call, the channel is switched to the control channel and the operation is placed in to a normal call mode.

The operation of the cordless telephone system of the second embodiment will be described with reference to FIG. 10. It is now assumed that three outside lines EL1, EL2 and EL3 are connected to a control station 100 including three parent telephone units P1, P2 and P3 each selectively utilizing three channels 1ch, 2ch and 3ch. The control station 100 includes a control unit 107 (CB) utilizing a control channel 0ch. It is also assumed that four slave telephone units S1, S2, S3 and S4 are provided, each of the slave telephone units utilizing the control channel 0ch and the first, second and third channels 1ch, 2ch and 3ch. In FIG. 10, the vertical lines indicate used channels, the bold vertical lines indicate the channels available for conversation, the vertical waved lines indicate that the transmitter 116 is in operation in a parent or slave telephone unit, the solid arrows indicates radio communication between the control station 100 and the slave telephone units, and the broken arrows indicate communication between the control section 100 and the outside lines.

When an incomming call is transmitted through an outside line EL1, as indicated by the solid arrow 1 of FIG. 10, the control unit (CB) 107 transmits an incomming call receipt signal (see the point 704 of FIG. 8) through a control channel (0ch), as indicated by the solid arrow 2 of FIG. 10, The incomming call receipt signal includes information indicating a telephone number to specify a regenerative slave telephone unit and information indicating a channel number to specify a channel for use in conversation. Description will be continued on an assumption that the incomming call receipt signal specifies the representative slave telephone unit S4 and the first channel (1ch). The slave telephone units S1 to S4 which are in condition for awaiting the incomming call receipt signal through the control channel (0ch) from the control unit (CB) 107, receive the incomming call receipt signal.

In response to the incomming call receipt signal transmitted from the control unit (CB) 107, only the specified regenerative slave telephone unit S4 transmits an automatic answer signal (see the points 804 and 806 of FIG. 9) through the control channel (0ch), as indicated by the solid arrow 3 of FIG. 10. Thereafter, the slave telephone units S1, S2, S3 and S4 changes the available channel (see the point 808 of FIG. 9) from the control channel (0ch) to the first channel (1ch) specified by the incomming call receipt signal, as indicated at A. When the control unit 107 receives the automatic answer signal from the specified representative slave telephone unit S4, the digital computer 104 places the first parent telephone unit P1 into a condition for awaiting a signal through the specified first channel (1ch) from the representative slave telephone unit S4 (see the point 708 of FIG. 8). When the channel change to the first channel (1ch) is completed in the slave telephone units S1, S2, S3 and S4, the representative slave telephone unit S4 transmits a channel selection complete signal (see the point 810 of FIG. 9) through the first channel (1ch), as indicated by the solid arrow 4 of FIG. 10. Thereafter, the same channel (1ch) is available for the parent telephone unit P1 and the slave telephone units. When the parent telephone unit P1 receives the channel selection complete signal, it transmits an outside line indication signal (see the point 712 of FIG. 8) through the first channel (1ch), as indicated by the solid arrow 5 of FIG. 10, The representative slave telephone unit S4 is in a condition transmitting a non-modulated carrier (see the point 812 of FIG. 9) as the automatic answer signal through the first channel (1ch), as indicated by the solid arrow 6 of FIG. 10.

The ring signal incomming through the outside line EL1 is fed to the parent telephone unit P1 which transmits the ring signal (see the point 714 of FIG. 8) through the first channel (1ch), as indicated by the solid arrows 7 of FIG. 10. The slave telephone units respond to the ring signal transmitted from the parent telephone unit P1 by turning on their corresponding outside line indicators 201 (see the points 816 and 818 of FIG. 9).

It is now assumed that, under this condition, a call operation is performed on the first slave telephone unit S1 by pushing the end pushbutton 212 and then the outside line pushbutton 205. This call operation causes a channel change from the first channel (1ch) to the control channel (0ch) (see the point 842 of FIG. 9), as indicated at B of FIG. 10, and then causes transmission of a call signal (see the point 844 of FIG. 9) through the control channel (0ch) to the control unit 107, as indicated by the solid arrow 8 of FIG. 10. When the control unit 107 receives the call signal, the digital computer 104 causes the available channel detection unit 106 to search an available channel (in this case 2ch) and assigns the available channel (2ch) to another parent telephone unit P2 for transmitting the call to an outside line. The control unit 107 transmits an answer signal (see the points 716 to 726 of FIG. 8) through the control channel (0ch), as indicated by the solid arrow 9 of FIG. 10. This answer signal includes information indicating the new channel (2ch) for use in conversation. The slave telephone unit S1 responds to the answer signal by making a channel change from the control channel (0ch) to the specified second channel (2ch) (see the point 850 of FIG. 9), as indicated at C of FIG. 10. After the channel change is completed, the slave telephone unit S1 transmits a channel change complete signal (see the point 852 of FIG. 9) through the second channel (2ch), as indicated by the solid arrow 10 of FIG. 10. This channel change complete signal is received through the second channel (2ch) by the second parent telephone unit P2 which thereby comes into a condition for communication through the second channel (2ch) with the slave telephone unit S1. Thereafter, the parent telephone unit P2 transmits an outside line indication signal (see the point 730 of FIG. 8) through the second channel (2ch), as indicated by the solid arrow 11 of FIG. 10 to permit conversation through the parent telephone unit P2 between the slave telephone unit S1 and the outside line EL2, as indicated by the letter D of FIG. 10. When the slave telephone unit S1 receives the outside line indication signal, the outside line button 205 and the outside line indicator 202 come on. When the slave telephone unit S1 is placed into an on-hook condition, it transmits an end signal through the second channel (2ch), as indicated by the solid arrow 12 of FIG. 10, and turns off the outside line pushbutton 205 and the corresponding outside line indicator 202. Thereafter, the slave telephone unit S2 comes into a condition for awaiting the next incomming call receipt signal. It is also possible to change the channel for the slave telephone unit S2 to the same channel as used for another slave telephone unit responding to an incomming call receipt signal. When the parent telephone unit P2 receives the end signal, it transmits the end signal to the outside line and terminates the conversation.

It is now assumed that another incomming call is transmitted through the outside line EL3 after the conversation is terminated, as indicated by the solid arrow 13 of FIG. 10. In this case, no incomming call receipt signal is transmitted since the incomming call continues on the outside line EL1. The digital computer sets the outside line EL3 (see the point 740 of FIG. 8) and causes the parent telephone unit P1 to transmit a ring signal (see the point 714 of FIG. 8) through the first channel (1ch), as indicated by the solid arrow 14 of FIG. 10, in addition to the ring signal caused by the ring signal transmitted through the outside line EL1. Since the ring signals are transmitted through the first channel (1ch) from the parent telephone unit P1, they cannot be received by the first slave telephone unit S1 which is in a condition for awaiting a signal transmitted through the control channel (0ch). The slave telephone units S2, S3 and S4 receive the ring signals and turn on of off the corresponding outside line indicators 203.

Assuming now that the specified representative slave telephone unit S4 is placed into its off-hook condition, it terminates the transmission of the non-modulated carrier (see the point 868 of FIG. 9) and transmits a called-person's answer signal including information indicating the number of the outside line to be answered (see the points 870 and 872 of FIG. 9), as indicated by the solid arrow 15 of FIG. 10. The parent telephone unit P1 specifies a new regenerative slave telephone unit S3 (see the points 742 and 744 of FIG. 8) and a new available channel (3ch) (see the point 748 of FIG. 8). The patent telephone unit P1 transmits a representative slave unit specifying signal indicating the specified representative slave telephone unit S3 and the specified channel 3ch (see the point 756 of FIG. 8), as indicated by the solid arrow 16 of FIG. 10. Thereafter, conversation is permitted through the parent telephone unit P1 between the slave telephone unit S4 and the outside line EL1 (see the points 820 and 822 of FIG. 9). The slave telephone units S2 and S3 responds to the representative slave unit specifying signal by making a channel change from the first channel (1ch) to the specified third channel (3ch) (see the points 822–830 of FIG. 9), as indicated at E. The newly specified regenerative slave telephone unit S3 transmits a non-modulated carrier (see the point 834 of FIG. 9) for automatic answer to the remaining call, as indicated by the arrow 17 of FIG. 10.

It is now assumed that, under this condition, the slave telephone unit S2 is placed into its off-hook condition and it transmits a called-person's answer signal (see the point 872), as indicated by the arrow 18 of FIG. 10. This operation is made pushing the outside line pushbutton 205 and the dial pushbuttons 211 (see point 870). The parent telephone unit P3 receives the called-person's answer signal and transmits an interference indication signal (see the point 838), as indicated by the arrow 19 of FIG. 10, since interference occurs between the non-modulated carrier transmitted from the newly specified representative slave telephone unit and the called-person's answer signal transmitted from the slave telephone unit S2. The slave telephone unit S3 receives the interference indication signal and terminates the transmission of the non-modulated carrier (see the points 858 and 860), whereas the slave telephone unit S2 receives the interference indication signal and transmits a called-person's answer signal again (see the points 838 and 858-864), as indicated by the arrow 20 of FIG. 10. The parent telephone unit P3 receives the called-person's answer signal and transmits a representative slave unit specifying signal (see the points 742-756 of FIG. 8), as indicated by the arrow 21 of FIG. 10, The slave telephone unit S3 receives this specifying signal and makes a channel change from the third channel (3ch) to the control channel (0ch) as indicated at F, whereas the slave telephone unit S2 receives the specifying signal and conversation is permitted through the third channel (3ch) between the slave telephone unit S2 and the outside line EL3. On the other hand, the newly specified representative slave telephone unit S3 is placed into a waiting condition. The slave telephone unit S2 transmits an end signal, as indicated by the arrow 22 of FIG. 10 when the conversation is terminated. The slave telephone unit S4 transmits an end signal, indicated by the arrow 23 of FIG. 10, when the conversation is terminated.

Description will be made to the transfer operation of the cordless telephone system of FIG. 1 with reference to FIGS. 11 to 13.

Figure 11:
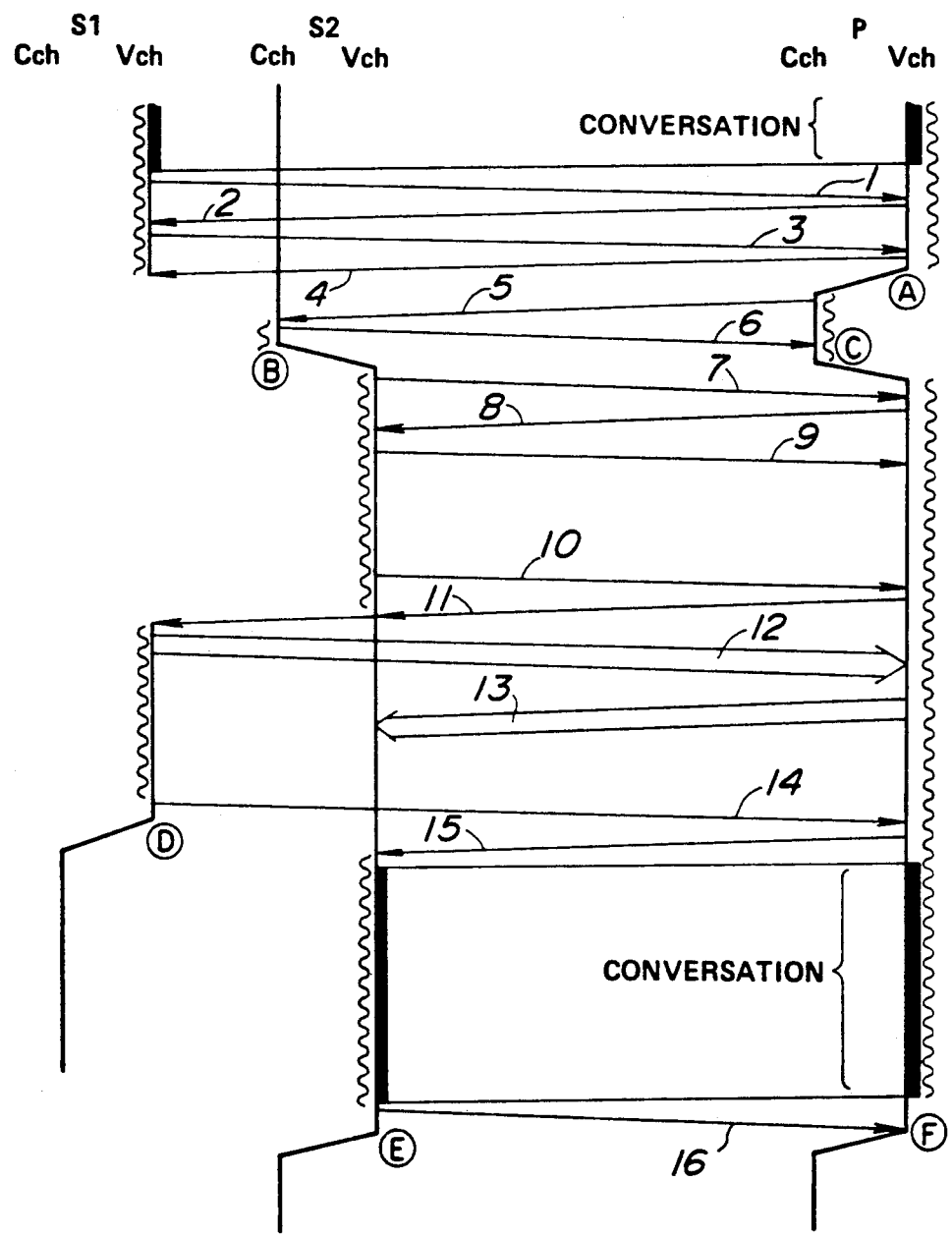
FIGS. 11, 12 and 13 are diagrams used in explaining the transfer operation of the cordless telephone system of FIG. 1.
Figure 12:
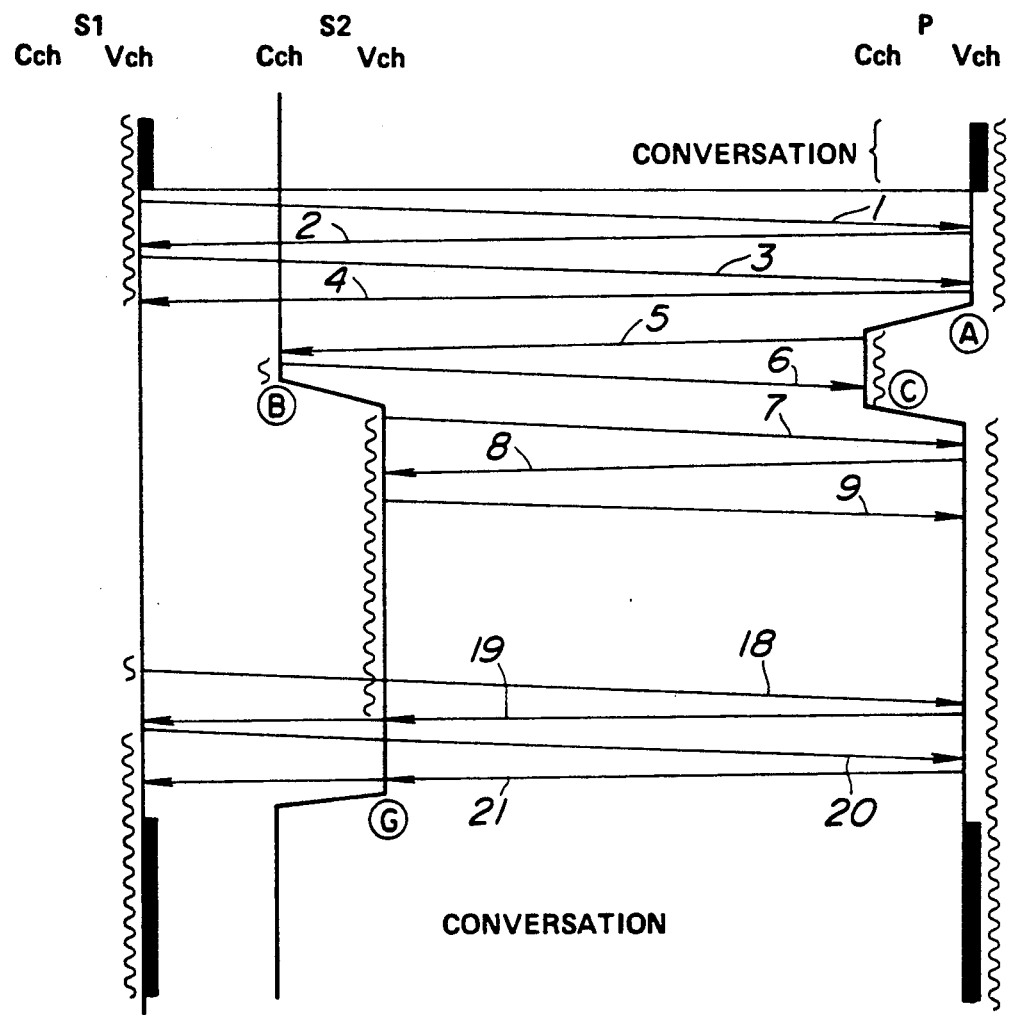

FIG. 11 relates to the case employing a communication channel Vch to transfer conversation through a parent telephone unit P from a slave telephone unit S1 to another slave telephone unit S2 which has been switched to a control channel Cch for awaiting a signal from the control unit 107. First of all, the user pushes a hold pushbutton 207, causing the slave telephone unit S1 to transmit a hold signal, as indicated by the arrow 1 of FIG. 11. The parent telephone unit P receives the hold signal and transmits a hold answer signal, as indicated by the arrow 2 of FIG. 11. When the slave telephone unit S1 receives the hold answer signal, its hold button 207 comes on. Thereafter, the user composes the number of the slave telephone unit S2 to which the conversation is to be transferred by depressing appropriate keys of the dial keyboard 211, a slave unit specifying signal indicating the figures of this number then being transmitted, as indicated by the arrow 3 of FIG. 11. The parent telephone unit receives the slave unit specifying signal and transmits a specifying signal receipt signal, as indicated by the arrow 4 of FIG. 11. When the slave telephone unit S1 receives the specifying signal receipt signal, its extension button 206 comes on and its transmitter 116 is turned off to inhibit signal transmission from the slave telephone unit S1.

After the parent telephone unit P receives the slave unit specifying signal, it makes a channel change from the communication channel Vch to the control channel Cch, as indicated by the character A of FIG. 11, and then transmits a transfer request receipt signal, as indicated by the arrow 5 of FIG. 11, through the control channel Cch. The transfer request receipt signal includes information specifying a slave telephone unit to which the conversation is to be transferred and information specifying the channel to be used for conversation. The specified channel is the same as used during the conversation by the slave telephone unit S1.

The slave telephone unit S2, which is specified by the transfer request receipt signal, transmits an answer signal, as indicated by the arrow 6 of FIG. 11, and makes a channel change from the control channel Cch to the communication channel Vch, as indicated by the character B of FIG. 11. The slave telephone unit S2 transmits a channel change complete signal, as indicated by the arrow 7 of FIG. 11, through the communication channel Vch. Similarly, the parent telephone unit P makes a channel change from the control channel Cch to the communication channel Vch, as indicated by the character C of FIG. 11, in response to receipt of the answer signal transmitted through the control channel Cch from the slave telephone unit S2, and it transmits an outside line indication signal, as indicated by the arrow 8 of FIG. 11, through the communication channel Vch in response to the channel change complete signal transmitted through the communication channel Vch from the slave telephone unit S2. The outside line indication signal indicates the outside line on which the conversation is held. When the slave telephone unit S2 receives the outside line indication signal, it turns on and off the extension button 206, produces a ringing tone, and transmits a non-modulated carrier, as indicated by the arrow 9 of FIG. 11. This non-modulated carrier transmission continues until the slave telephone unit S2 makes a called-person's answer or the parent telephone unit P detects interference. It is to be understood that the non modulated carrier is transmitted from the slave telephone unit S2 for the purpose of returning the slave telephone unit S1 into communication with the parent telephone unit P.

When the user makes an called-person's answer, for example, by pushing the extension button 206, the slave telephone unit S2 transmits a called-person's answer signal, as indicated by the arrow 10 of FIG. 11. In response to this called-person's answer signal, the parent telephone unit P transmits a conversation start signal, as indicated by the arrow 11 of FIG. 11. The slave telephone unit S1 responds to the conversation start signal by turning on the transmitter 116 to permit signal transmission from the slave telephone unit S1, whereas the slave telephone unit S2 responds to the conversation start signal by turning on the extension button 206 and at the same time turning off the transmitter 116 to inhibit signal transmission from the slave telephone unit S2. When the slave telephone unit S1 transmits a voice signal, as indicated by the bold arrow 12 of FIG. 11, at a frequency, for example, 254 MHz, the parent telephone unit P receives the voice signal and transmits the received voice signal, as indicated by the bold arrow 13 of FIG. 11, at another frequency, for example, 380 MHz. In this manner, conversation is allowed through the parent telephone unit P only in one direction from the slave telephone unit S1 to the slave telephone unit S2.

When the user places the slave telephone unit S1 into its on-hook condition, for example, by placing the handset back onto its base unit, the slave telephone unit S1 transmits an end signal, .as indicated by the arrow 14 of FIG. 11, and makes a channel change from the communication channel Vch to the control channel Cch, as indicated by the character D of FIG. 11, for awaiting the next signal from the control unit 107. When the parent telephone unit P receives the end signal, it transmits a conversation start signal, as indicated by the arrow 15 of FIG. 11, through the communication channel Vch. When the slave telephone unit S2 receives the conversation start signal, the slave telephone unit S2 is placed into conversation with the outside line and the transfer operation is completed. When the conversation is terminated, the slave telephone unit S2 transmits a conversation end signal, as indicated by the arrow 16 of FIG. 11, and makes a channel change from the communication channel Vch to the control channel Cch, as indicated by the character E of FIG. 11, for awaiting the next signal from the control unit 107. When the parent telephone unit P receives the conversation end signal, it makes a channel change from the communication channel Vch to the control channel Cch, as indicated by the character F of FIG. 11.

If the slave telephone unit S2 makes no called-person's answer to the transfer request made from the slave telephone unit S1, the slave telephone unit S1 returns to its initial condition where it is in communication with the outside line. This operation will be described with reference to FIG. 12.

The steps performed until the slave telephone unit S2 automatically transmits a non-modulated carrier after the slave telephone unit S1 makes a transfer request are the same as described in connection with FIG. 11. When the user makes a hold release operation, for example, by pushing the hold button 207 of the slave telephone unit S1 again if no called-person's answer signal is transmitted from the slave telephone unit S2, the slave telephone unit S1 turns on its transmitter 116 temporarily to transmit a hold release signal, as indicated by the arrow 18 of FIG. 12. The parent telephone unit P detects interference between this hold release signal and the non-modulated carrier transmitted from the slave telephone unit S2 and transmits an interference indication signal, as indicated by the arrow 19 of FIG. 12. The slave telephone unit S2 responds to the interference indication signal by turning off the transmitter 116 to stop transmitting the non-modulated carrier, stopping the ring tone, and turning off the extension button 206, whereas the slave telephone unit S1 responds to the interference indication signal by turning on the transmitter 116 automatically to transmit a hold release signal again, by indicated by the arrow 20 of FIG. 12. When the parent telephone unit P receives this hold release signal, it transmits and end signal, as indicated by the arrow 21 of FIG. 12. The end signal includes information specifying a slave telephone unit on which the conversation is to be terminated. The slave telephone unit S2 responds to the end signal by making a channel change from the communication channel Vch to the control channel Cch, as indicated by the character G of FIG. 12, for awaiting the next signal from the control unit 107, whereas the slave telephone unit S1 responds to the end signal by turning off the hold button and returning into communication with the outside line.

Figure 13:
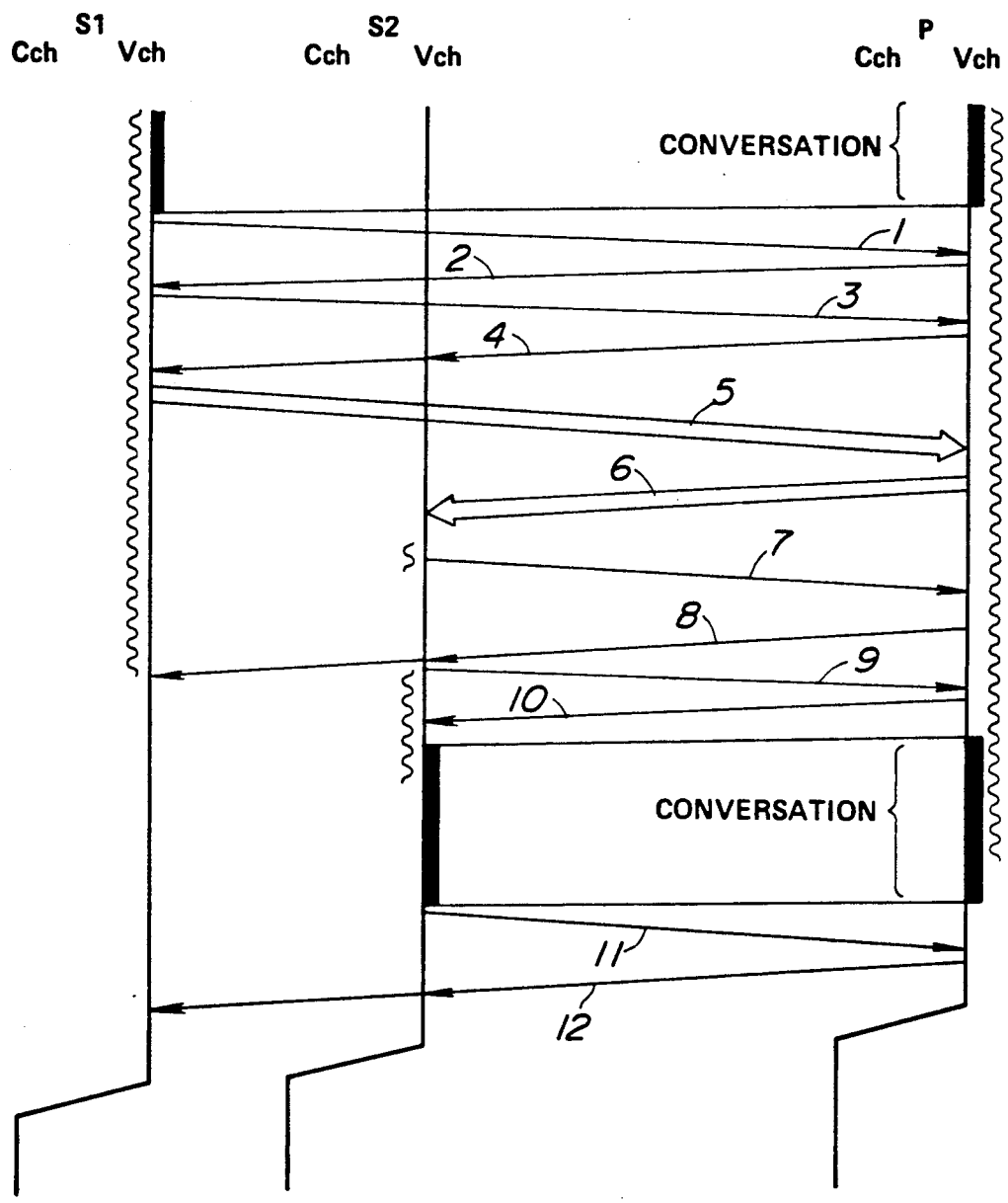

Referring to FIG. 13, description will be made to another transfer method. Also in this case, the cordless telephone system may employ a signal parent telephone unit. When a slave telephone unit S1 utilizes a communication channel Vch in conversation with an outside line through the parent telephone unit P, the same communication channel Vch is set for the other slave telephone units.

When the user pushes the hold button 207 of the slave telephone unit S1 which is in conversation with the outside line, the slave telephone unit S1 holds the telephone line and transmits a hold signal, as indicated by the arrow 1 of FIG. 13. Upon receipt of the hold signal, the parent telephone unit P transmits a hold answer signal, as indicated by the arrow 2 of FIG. 13. When the slave telephone unit S1 receives the hold answer signal, it turns on the hold button 207. If the user specify a slave telephone unit to which the conversation is to be transferred, for example, by depressing appropriate keys of the dial keyboard 211, a slave unit specifying signal is transmitted from the slave telephone unit S1, as indicated by the arrow 3 of FIG. 13.

When the parent telephone unit P receives this slave unit specifying signal, it transmits a conversation start signal, as indicated by the arrow 4 of FIG. 13. This conversation start signal includes information specifying the number of the specified slave telephone unit. The specified slave telephone unit turns on its extension button 206 and turns on the speaker amplifier circuit 121. If the user makes a speech toward the microphone 112, the slave telephone unit S1 transmits a voice signal, indicated by the bold arrow 5 of FIG. 13, at a frequency, for example, 254 MHz. The parent telephone unit P receives the voice signal and transmits the received voice signal, as indicated by the bold arrow 6 of FIG. 13, at another frequency, for example, 380 MHz. In this manner, conversation is allowed through the parent telephone unit P only in one direction from the slave telephone unit S1 to the slave telephone unit S2.

When the user makes a called-person's answer to the call, for example, by pushing the outside line button 205 of the slave telephone unit S2, the slave telephone unit S2 transmits a called-person's answer signal, as indicated by the arrow 9 of FIG. 13. This called-person's answer signal will interfere with the signal transmitted from the slave telephone unit S1. The parent telephone unit P detects the interference and transmits an interference indication signal, as indicated by the arrow 8 of FIG. 13. The slave telephone unit S1 responds to the interference indication signal by stopping the signal transmission. Whereas the slave telephone unit S2 responds to the interference indication signal by turning on the transmitter 116 to transmit a called-person's answer signal again, as indicated by the arrow 9 of FIG. 13. When the parent telephone unit P receives this called-person's answer signal, it transmits a conversation start signal, as indicated by the arrow 10 of FIG. 13. When the slave telephone unit S2 receives the conversation start signal, it turns off the extension button 206, turns on the outside line button, and comes into communication with the outside line through the parent telephone unit P.

If no called-person's answer signal is transmitted from the slave telephone unit S2, the user can return the slave telephone unit S1 into communication with the parent telephone unit by pushing the hold button 207 again to release the hold condition.

When the conversation is terminated and the slave telephone unit S2 is placed into its on-hook position, the slave telephone unit S2 transmits a conversation end signal, as indicated by the arrow 11 of FIG. 13. The parent telephone unit P responds to the conversation end signal by transmitting an end signal, indicated by the arrow 12 of FIG. 13, and making a channel change from the communication channel Vch to the control channel Cch. When the slave telephone units S1 and S2 receives the end signal, they make a channel change from the communication channel Vch to the control channel Cch.

Although it is assumed in this embodiment that the same communication channel is set for all of the slave telephone units before conversation is transferred from a first slave telephone unit to a second slave telephone unit, it is to be noted that the slave telephone units except for the second slave telephone unit may make a channel change from the control channel to the communication channel in response to receipt of a hold signal transmitted from the first slave telephone unit.

The multi-channel access type radio communication system of the invention has been described as utilizing a single control channel for all of the parent and slave telephone units in controlling a number of communication channels. In this case, the parent telephone unit searches a frequency available for signal transmission in a direction from the parent telephone unit to the slave telephone unit and transmits a signal indicating the searched available communication channel through the control channel to the slave telephone unit. The slave telephone unit responds to this communication channel indication signal by searching a frequency available for signal transmission in a direction from the slave telephone unit to the parent telephone unit and transmitting a signal indicating the searched available communication channel through the control channel to the parent telephone unit. However, such a single control channel setting method would fail to control the communication channels if the control channel is subject to radio interference, radio jamming, or other radio impediment.

In order to avoid such a difficulty, it may be considered to apply an all channel circulative check method to the multi-channel access type radio communication system of the invention. In this case, no control channel is provided. The parent telephone unit searches a communication channel available for signal transmission in a direction from the parent telephone unit to the slave telephone unit and transmits a control signal through the searched communication channel. The slave telephone unit checks the communication channels in a circulative manner until it detects a communication channel through which the control signal is transmitted from the parent telephone unit. When the slave telephone unit looks at a communication channel through which the control signal is transmitted thereto from the parent telephone unit, it makes a determination as to whether or not the communication channel corresponding to the detected communication channel is available. If the corresponding communication channel is available, the slave telephone unit indicates the available communication channel to the parent telephone unit. If the corresponding frequency is busy, the parent telephone unit searches another available communication channel and transmits a control signal through the another communication channel to the slave telephone unit. However, such an all channel circulative check method requires a relative long time to set a communication channel for use in conversation between the parent and slave telephone units.

Figure 14:
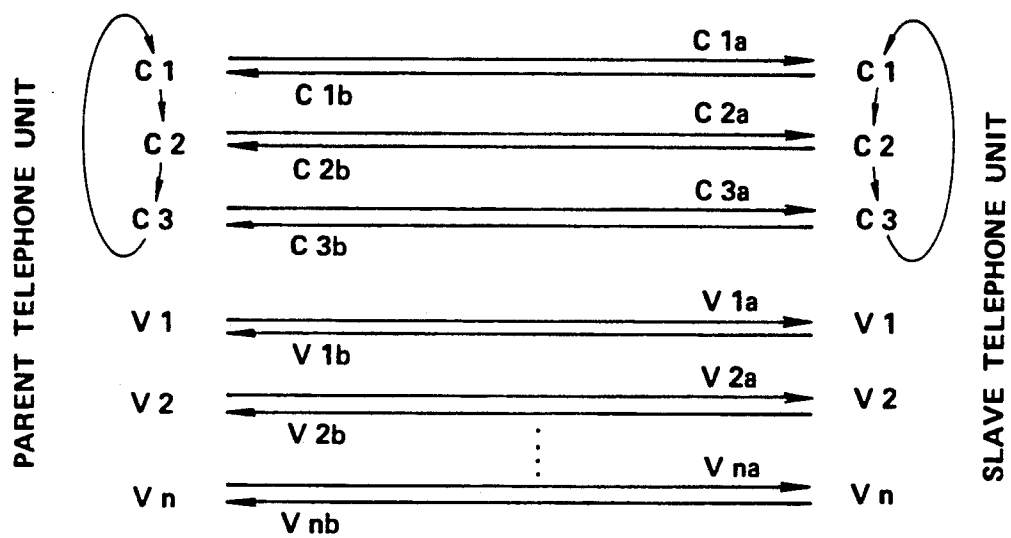
FIG. 14 is a diagram used in explaining the operation of the cordless telephone system employing a plurality of control channels.

Referring to FIG. 14, there is illustrated an advantageous method of the invention where a regular control channel C1 and two auxiliary control channels C2 and C3 are provided. The control channels C1, C2 and C3 are used in a circulative manner for controlling a number of communication channels V1 to Vn. The parent telephone unit monitors the presence of radio interference of the frequency of the regular control channel C1 used for signal transmission from the slave telephone unit to the parent telephone unit. If interference occurs, the parent telephone unit selects one of the auxiliary control channels C2 and C3 and transmits a control channel setting signal through the selected control channel to the slave telephone unit. This control channel setting signal transmission continues until the radio interference with the regular control channel C1 disappears. The parent telephone unit transmits a call receipt signal to the slave telephone unit through the control channel through which the control channel setting signal is transmitted.

The slave telephone unit always monitor the control channels C1, C2 and C3 in a circulative manner. When the slave telephone unit receives the control signal from the parent telephone unit, it interrupts the control channel monitoring operation and selects the control channel through which the control signal is transmitted from the parent telephone unit. If the slave telephone unit produces a call request while it receives the control channel setting signal, the slave telephone unit will transmit a call signal through another control channel.

Figure 15:
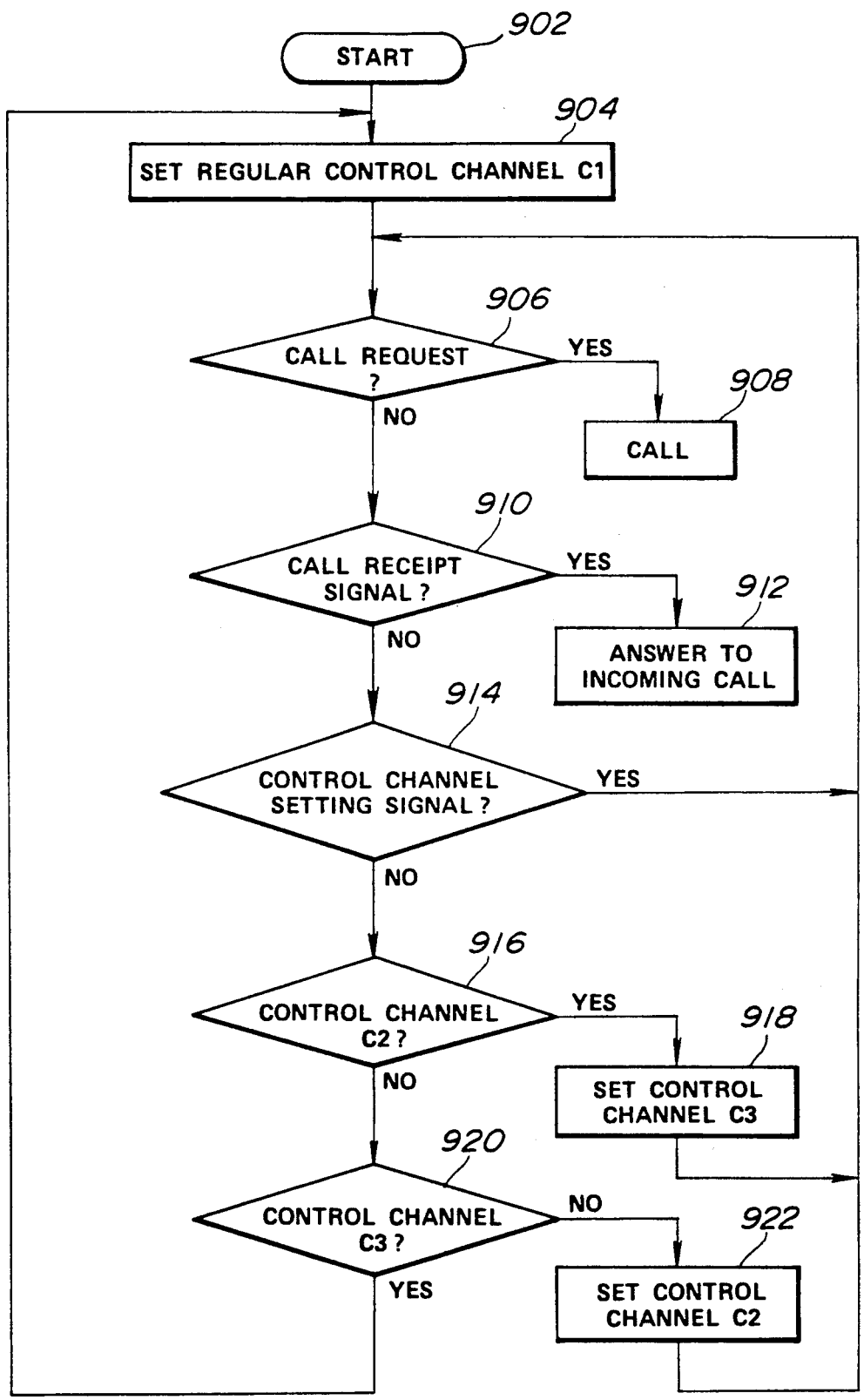
FIG. 15 is a flow diagram used in explaining the control channel monitoring operation of the slave telephone units.

FIG. 15 is a flow diagram illustrating the programming of the digital computer included in each slave telephone unit.

The computer program is entered at the point 902 when the slave telephone unit is placed into a waiting condition. At the point 904 in the program, the regular control channel C1 is set for receiving its frequency C1a. At the point 906 in the program, a determination is made as to whether or not a call request is made on the slave telephone unit. If the answer to this question is "yes", then the program proceeds to the point 908 where the slave telephone unit is placed into a condition for a call. The carrier frequency through a call signal is transmitted from the slave telephone unit is dependent on the set control channel as described previously. Otherwise, the program proceeds to another determination step at the point 910. This determination is as to whether or not the slave telephone unit receives a call receipt signal from the parent telephone unit. The received frequency is dependent on the set control channel as described previously. If the answer to this question is "yes", then the program proceeds to the point 912 where the slave telephone unit is placed into a mode providing an answer to the call. The frequency through which an answer signal is transmitted from the slave telephone unit is dependent on the set control channel. Otherwise, the program proceeds to the point 914.

At the point 914 in the program, a determination is made as to whether or not the slave telephone unit receives a control channel setting signal from the parent telephone unit. If the answer to this question is "yes", then the program returns to the point 906. Otherwise, the program proceeds to another determination step at the point 916. This determination is as to whether or not the auxiliary control channel C2 has been set. If the answer to this question is "yes", then the program proceeds to the point 918 where a channel change is made from the auxiliary control channel C2 to the auxiliary control channel C3 and then the program returns to the point 906. Otherwise, the program proceeds from the point 916 to another determination step at the point 920. This determination is as to whether or not the auxiliary control channel C3 has been set. If the answer to this question is "yes", then the program returns to the point 904. Otherwise, the program proceeds to the point (22 where the auxiliary control channel C2 is set and then the program returns to the point 906.

Assuming first that the regular control channel C1 is not subject to any radio impediment, no control channel setting signal is transmitted. It is to be noted that the control channel setting signal is not transmitted through the regular control channel C1. In either case, thus, the program proceeds from the point 914 through the points 916 and 920 to the point 922 where a channel change is made from the regular control channel C1 to the auxiliary control channel C2. Following this, the program proceeds through the points 906 and 910 to the point 914. Since the regular control channel C1 is normal, the slave telephone unit receives no control channel specifying signal. Thus, the program proceeds from the point 914 through the point 916 to the point 918 where the auxiliary control channel C2 is changed to the auxiliary control channel C3. Following this, the program proceeds from the point 708 through the points 916, 910, 914, 916 and 920 to the point 904. This operation is repeated.

It is now assumed that an abnormal condition occurs in the regular control channel C1 and a control channel setting signal is transmitted through the auxiliary control channel C2. The operation is the same as described above in connection with the case where the regular control channel C1 is normal until the program proceeds to the point 922 since the regular control channel C1 is set at the point 904. Following this, the program proceeds from the point 922 through the points 906 and 910 to the point 914. Since a control channel setting signal is transmitted through the auxiliary control channel C2, the program returns from the point 914 to the point 906. The steps at the points 906, 910 and 914 are repeated until the transmission of the control channel setting signal is terminated.

It is now assumed that an abnormal condition occurs in the regular control channel C1 and a control channel setting signal is transmitted through the auxiliary control channel C3. The operation is the same as described above in connection with the case where the regular control channel C1 is normal until the program proceeds to the point 922 since the regular control channel C1 is set at the point 904. Following this, the program proceeds from the point 922 through the points 906 and 910 to the point 914. Since the control channel setting signal is transmitted through the auxiliary control channel C3, the program proceeds from the point 914 to the point 916. Since the auxiliary control channel C2 is set at the point 922, the program proceeds from the point 916 to the point 918 where a channel change is made from the auxiliary control channel C2 to the auxiliary control channel C3. Following this, the program proceeds from the point 918 through the points 906 and 910 to the point 914. Since the control channel setting signal is transmitted through the auxiliary control channel C3, the program returns from the point 914 to the point 906. The steps at the point 906, 910 and 914 are repeated until the transmission of the control channel setting signal is terminated.

Accordingly, it is apparent that when an abnormal condition occurs in the regular control channel, the parent telephone unit transmits a control channel setting signal through an auxiliary control channel to cause the slave telephone unit to set the same auxiliary control channel as the auxiliary control channel through which the parent telephone unit is transmitting the control channel setting signal.

With cordless telephone systems, the speech quality would decreases to a great extent for any of reasons. It is, therefore, desired to automatically change the communication channel so as to resume the speech quality. FIG. 16 is a flow diagram illustrating a part of the processes for available frequency selection, transmission and receipt of a mobile station. As can be seen from a study of the flow diagram o FIG. 16, the mobile station is placed into a waiting mode when a blind or dead condition continues for a time longer than 10 seconds during the conversation. In addition, the mobile station changes the communication channel when signal interference continues for a time longer than 5 seconds and it comes into a waiting mode when signal interference continues for a time longer than 15 seconds.

In order to monitor the speech quality, it is the conventional practice to detect the signal interference and the received electric field intensity. However, the speech quality reduction is dependent not only on the signal interference and the received electric field intensity, but also on multi-path and facing which cannot be measured with ease. In addition, the conventional practice requires separate signal interference and received electric field intensity detectors. This increases the necessary part number, causing a larger-sized and expensive radio communication system.

In order to avoid these difficulties, the FIG. 2 arrangement includes bandpass filter and adder circuits 126 and 127 provided in the signal transmission section and low pass filter, bandpass filter and low pass filter circuits 128, 129 and 130 provided in the signal receipt section.

In the signal transmission section, an voice signal is applied from the microphone amplifier 114 to the adder 127 through the bandpass filter 126 which blocks signal components except for the other voice signal components of frequencies ranging from about 100 Hz to about 15 KHz. The digital computer 124 produces 200 bps predetermined speech quality monitoring data of a M-series code to the adder 127 through the low pass filter 128 which filters out signal components at frequencies higher than 100 Hz. The adder 127 addes the voice signal and the speech quality monitoring data in a multi-frequency manner. The resulting signal is fed from the adder 127 to the modulator 115.

In the signal receipt section, a demodulated signal is applied from the demodulator 120 to the speaker amplifier 121 through the bandpass filter 129 which blocks the signal components except for the other signal components of frequencies ranging from about 100 Hz to about 14 KHz. The received speech quality monitoring data included in the demodulator 120 are fed to the digital computer 124 through the low pass filter 130 which blocks the signal components except for the other signal components of frequencies lower than 100 Hz. The digital computer 124 compares the transfer and duty ratio of the received speech quality monitoring data with those of the predetermined speech quality monitoring data, calculates an error ratio, and changes the communication channel when the calculated error ratio is in a predetermined range.

Since the predetermined digital speech quality monitoring data are multi-frequency transmitted with the voice signal, the mating radio communication unit which has the same arrangement as the communication unit can check the speech quality based on the error ratio by making a determination as to whether or not the received speech quality monitoring data re identical to the predetermined speech quality monitoring data. After the communication unit receives the signal multi-frequency transmitted from the mating communication unit, it separates the speech quality monitoring data and the voice signal, compares the received speech quality monitoring data with the predetermined speech quality monitoring data, and comes into a waiting mode when the error ratio increases to a predetermined extent. In addition, it is possible to detect a speech quality reduction with high accuracy regardless of the cause of the speech quality reduction.

The method requires a plurality of inexpensive components 126, 127, 128, 129 and 130 and a modification of the program of the digital computer 124 and requires no expensive interference and received electric field intensity detectors.

What is claimed is:

1. A method for radio communication between at least one parent communication unit and a plurality of slave communication units, comprising the steps of:

transmitting a transfer request signal through a first channel from a first slave communication unit, the transfer request signal including information specifying a slave communication unit to which transfer is requested;

transmitting a transmission inhibit signal through the first channel from the parent communication unit to inhibit the signal transmission from the first slave communication unit after the transfer request signal is received;

transmitting a transfer request receipt signal through a second channel from the parent communication unit to a second slave communication unit;

transmitting an answer signal through the second channel from the second slave communication unit in response to receipt of the transfer request receipt signal;

making a channel change to the first channel for the second slave communication unit;

transmitting a called-person's answer signal through the first channel when the second slave communication unit makes a called-person's answer;

transmitting a conversation start signal through the first channel from the parent communication unit to the first and second slave communication units;

making conversation through the first channel from the first slave communication unit to the second slave communication unit in response to receipt of the conversation start signal;

transmitting a conversation end signal through the first channel from the first slave communication unit; and making a channel change to the second channel for the first slave communication unit.

2. A method for radio communication between at least one parent communication unit and a plurality of slave communication units, comprising the steps of:

transmitting a transfer request signal through a first channel from a first slave communication unit, the transfer request signal including information specifying a slave communication unit to which transfer is requested;

transmitting a transmission inhibit signal through the first channel to inhibit the signal transmission from the first slave communication unit after the transfer request signal is received;

transmitting a transfer request receipt signal through a second channel from the parent communication unit to a second slave communication unit;

transmitting an answer signal through the second channel from the second slave communication unit in response to receipt of the transfer request receipt signal;

making a channel change to the first channel for the second slave communication unit;

transmitting a non-modulated carrier through the first channel from the second slave communication unit;

transmitting a hold release signal through the first channel when the first slave communication unit releases its hold condition;

transmitting an interference indication signal through the first channel when the parent communication unit detects interference between the non-modulated carrier and the hold release signal;

re-transmitting the hold release signal through the first channel from the first slave communication unit in response to receipt of the interference indication signal;

transmitting a conversation end signal in response to receipt of the re-transmitted hold release signal; and making a channel change to the second channel for the second slave communication unit.

3. A method for radio communication between at least one parent communication unit and a plurality of slave communication units, comprising the steps of:

transmitting a transfer request signal through a first channel from a first slave communication unit, the transfer request signal including information specifying a slave communication unit to which transfer is requested;

transmitting a slave communication unit specifying signal through the first channel from the parent communication unit in response to receipt of the transfer request signal, the slave communication unit specifying signal specifying a second slave communication unit as the slave communication unit to which transfer is requested;

making conversation through the first channel from the first slave communication unit to the second slave communication unit in response to receipt of the slave communication unit specifying signal;

transmitting a called-person's answer signal when a called-person's answer is made by the second slave communication unit;

transmitting an interference indication signal from the parent communication unit when interference is detected between a voice signal transmitted from the first slave communication unit and the called-person's answer signal transmitted from the second slave communication unit;

transmitting a conversation end signal through the first channel from the first slave communication unit; and terminating the signal transmission from the first slave communication unit in response to receipt of the interference indication signal.

4. A radio communication system comprising a microphone and bandpass filter for inputting a voice signal having a first predetermined frequency band, means for producing predetermined speech quality monitoring data monopolizing a second predetermined frequency band different than the first predetermined frequency band of the voice signal, means for combining the voice signal and the speech quality monitoring data, means for multi-frequency transmitting the voice signal combined with the predetermined speech quality monitoring data, means for receiving the multi-frequency transmitted voice signal and speech quality monitoring data, means for separating the multi-frequency transmitted speech quality monitoring data from the multi-frequency transmitted voice signal, and means for detecting the speech quality based upon a comparison of the separated speech quality monitoring data with the produced predetermined speech quality monitoring data.

5. A method utilizing a plurality of channels for radio communication between a plurality of parent communication units and a plurality of slave communication units, comprising the steps of:

transmitting a communication channel specifying signal through a first communication channel from one of the parent communication units, the communication channel specifying signal specifying the first communication channel;

making a channel change to the first communication channel for available ones of the slave communication units in response to receipt of the communication channel specifying signal;

transmitting a call signal through the first communication channel from a parent communication unit to which the first communication channel is assigned, the call signal including information indicating an outside line through which an incomming call is transmitted;

transmitting a called-person's answer signal through the first communication channel when a called-person's answer is made by one of the slave communication units to which the first communication channel is assigned, the called-person's answer signal including information indicating the one slave communication unit;

transmitting a slave communication unit specifying signal through the first communication channel from the one parent communication unit in response to receipt of the called-person's answer signal, the slave communication unit specifying signal specifying a slave communication unit communicable with the one parent communication unit;

transmitting a channel specifying signal through the first communication channel from the one parent communication unit in response to receipt of the called-person's answer signal, the channel specifying signal specifying a channel except for the first communication channel; and making a channel change from the first communication channel to the channel specified by the channel specifying signal for the slave communication units except for the slave communication unit specified by the slave communication unit specifying signal.

* * * * *